(12) United States Patent
Ebrahimi et al.

(10) Patent No.: US 12,541,568 B2
(45) Date of Patent: Feb. 3, 2026

(54) METHOD, SYSTEM, AND COMPUTER PROGRAM PRODUCT FOR RECURRENT NEURAL NETWORKS FOR ASYNCHRONOUS SEQUENCES

(71) Applicant: Visa International Service Association, San Francisco, CA (US)

(72) Inventors: Javid Ebrahimi, Redwood City, CA (US); Wei Zhang, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 1101 days.

(21) Appl. No.: 17/514,354

(22) Filed: Oct. 29, 2021

(65) Prior Publication Data

US 2022/0138501 A1 May 5, 2022

Related U.S. Application Data

(60) Provisional application No. 63/107,064, filed on Oct. 29, 2020.

(51) Int. Cl.
| | | |
|---|---|---|
| G06N 3/02 | (2006.01) | |
| G06F 18/21 | (2023.01) | |
| G06F 18/214 | (2023.01) | |
| G06F 18/25 | (2023.01) | |
| G06N 3/044 | (2023.01) | |

(52) U.S. Cl.
CPC ...... *G06F 18/2148* (2023.01); *G06F 18/2163* (2023.01); *G06F 18/25* (2023.01); *G06N 3/02* (2013.01)

(58) Field of Classification Search
CPC ......... G06N 3/0442; G06N 3/02; G06N 3/044
See application file for complete search history.

(56) References Cited

U.S. PATENT DOCUMENTS

| | | |
|---|---|---|
| 2019/0370637 A1 | 12/2019 | Dunning et al. |
| 2020/0258500 A1 | 8/2020 | Heigold et al. |
| 2021/0248376 A1* | 8/2021 | Zhao ............ G06V 20/49 |
| 2023/0334306 A1* | 10/2023 | Zhang ............ G06N 3/08 |

OTHER PUBLICATIONS

Goyal et al, Recurrent Independent Mechanisms Sep. 14, 2019, Arxiv.*

(Continued)

*Primary Examiner* — Abdullah Al Kawsar
(74) *Attorney, Agent, or Firm* — The Webb Law Firm

(57) ABSTRACT

A method for recurrent neural networks for asynchronous sequences may include receiving first input data associated with a plurality of first data items ordered in a first sequence and second input data associated with a plurality of second data items ordered in a second sequence. Each first data item may be of a first type, and each second data item may be of a second type. Each respective data item of the first and second data items may be inputted with an indicator associated with a respective type of the respective data item to a recurrent unit of a recurrent neural network (RNN). A respective portion of a hidden state may be determined based on the indicator. The respective portion of the hidden state may be updated based on the respective data item and the indicator. A system and computer program product are also disclosed.

9 Claims, 10 Drawing Sheets

(56) References Cited

OTHER PUBLICATIONS

Li et al, Recurrent neural networks with segment attention and entity description for relation extraction from clinical texts Jun. 2019, Elsevier, Artificial Intelligence in Medicine vol. 97.*
Exploring Interpretable LSTM Neural Networks over Multi-Variable Data (Year: 2019).*
Multi-Timescale Long Short-Term Memory Neural Network for Modelling Sentences and Documents (Year: 2015).*
Shuffling Recurrent Neural Networks (Year: 2020).*
A Survey on Tensor Techniques and Applications in Machine Learning (Year: 2019).*
Agrawal et al., "Mining Association Rules between Sets of Items in Large Databases", Proceedings of the 1993 ACM SIGMOD Conference, Washington DC, 1993, 10 pages.
Bahdanau et al., "Neural Machine Translation by Jointly Learning to Align and Translate", published as a conference paper at ICLR 2015, 15 pages.
Branco et al., "Interleaved Sequence RNNs for Fraud Detection", KDD '20, Aug. 23-27, 2020, 9 pages.
Cheng et al., "Where You Like to Go Next: Successive Point-of-Interest Recommendation", Proceedings of the Twenty-Third International Joint Conference on Artificial Intelligence, 2013, pp. 2605-2611.
Cho et al., "Learning Phrase Representations using RNN Encoder-Decoder for Statistical Machine Translation", 2014, 15 pages.
Fang et al., "Deep Learning for Sequential Recommendation: Algorithms, Influential Factors, and Evaluations", ACM Transactions on Information Systems, Jan. 2020, 41 pages.
He et al., "Fusing Similarity Models with Markov Chains for Sparse Sequential Recommendation", In 2016 IEEE 16th International Conference on Data Mining (ICDM), IEEE, 10 pages.
Hidasi et al., "Session-Based Recommendations With Recurrent Neural Networks", published as a conference paper at ICLR 2016, 10 pages.
Huang et al., "CSAN: Contextual Self-Attention Network for User Sequential Recommendation", Session: Multimedia-1 (Multimedia Recommendation & Discovery), MM'18, Oct. 22-26, 2018, Seoul, Republic of Korea, 2018, pp. 447-455.
Nan et al., "Tying Word Vectors and Word Classifiers: a Loss Framework for Language Modleing"; published as a conference paper at ICLR 2017, 13 pages.
Kaggle, "eCommerce Events History in Cosmetics Shop", https://www.kaggle.com/mkechinov/ecommerce-events-history-in-cosmetics-shop, Mar. 2, 2022, 1 page.
Kaggle, "Retailrocket recommender system dataset", https://www.kaggle.com/retailrocket/ecommerce-dataset, Mar. 2, 2022, 1 page.
Kamehkhosh et al., "A Comparison of Frequent Pattern Techniques and a Deep Learning Method for Session-Based Recommendation", Workshop on Temporal Reasoning in Recommender System, collocated with ACM RecSys 17, Como, Italy, 7 pages.
Kang et al., "Self-Attentive Sequential Recommendation", In 2018 IEEE International Conference on Data Mining (ICDM), 10 pages.
Kingma et al., "ADAM: a Method for Stochastic Optimization", published as a conference paper at ICLR 2015, 15 pages.
Le et al., "Modeling Contemporaneous Basket Sequences with Twin Networks for Next-Item Recommendation", Proceedings of the Twenty-Seventh International Joint Conference on Artificial Intelligence (IJCAI-18), 2018, pp. 3414-3420.
Li et al., "Neural Attentive Session-based Recommendation", CIKM '17, Nov. 6-10, 2017, Singapore, 2017, 10 pages.
Li et al., "Learning from History and Present: Next-item Recommendation via Discriminatively Exploiting User Behaviors", KDD '18, Aug. 19-23, 2018, London, United Kingdom, 10 pages.
Liu et al., "Multi-behavioral Sequential Prediction with Recurrent Log-bilinear Model", Journal of Latex Class files, Aug. 2015, 14 pages, vol. 14:8.
Ludewig et al., "Evaluation of Session-based Recommendation Algorithms", User Modeling and User-Adapted Interaction 28, 2018, 45 pages.
Ma et al., "The Graph-based Broad Behavior-Aware Recommendation System for Interactive News", arXiv preprint arXiv:1812.00002 (2018), 13 pages.
Neil et al., "Phased LSTM: Accelerating Recurrent Network Training for Long or Event-based Sequences", 30th Conference on Neural Information Processing Systems (NIPS 2016), Barcelona, Spain, 9 pages.
Norris, "Markov Chains", 1998, No. 2, Cambridge University Press, 256 pages.
Rendle et al., "Factorizing Personalized Markov Chains for Next-Basket Recommendation", WWW 2010, Full Paper, Apr. 26-30, Raleigh, NC, pp. 811-820.
Smirnova et al., "Contextual Sequence Modeling for Recommendation with Recurrent Neural Networks", In Proceedings of ACM Recommender Systems Conference, Como, Italy, Aug. 27-31, 2017 (RecSys '17), 8 pages.
Song et al., "Multi-Rate Deep Learning for Temporal Recommendation", SIGIR '16, Jul. 17-21, 2016, Pisa, Italy, 4 pages.
Sordoni et al., "A Hierarchical Recurrent Encoder-Decoder for Generative Context-Aware Query Suggestion", CIKM 15, Oct. 19-23, 2015, Melbourne, Australia, 10 pages.
Tan et al., "Improved Recurrent Neural Networks for Session-based Recommendations", DLRS '16, Sep. 15, 2016, Boston, MA, 6 pages.
Tavakol et al., "Factored MDPs for Detecting Topics of User Sessions", RecSys '14, Oct. 6-10, 2014, Foster City, Silicon Valley, CA, 8 pages.
Vaswani et al., "Attention is All You Need", 31st Conference on Neural Information Processing Systems (NIPS 2017), Long Beach, CA, 15 pages.
Velickovic et al., "Graph Attention Networks", published as a conference paper at ICLR 2018, 12 pages.
Ying et al., "Sequential Recommender System based on Hierarchical Attention Network", Proceedings of the Twenty- Seventh International Joint Conference on Artificial Intelligence (IJCAI-18), pp. 3926-3932.
Yu et al., "A Dynamic Recurrent Model for Next Basket Recommendation", SIGIR '16, Jul. 17-21, 2016, Pisa, Tuscany, Italy, 4 pages.
Zadeh et al., "Tensor Fusion Network for Multimodal Sentiment Analysis", 2017, 12 pages.
Zhou et al., "ATRank: An Attention-Based User Behavior Modeling Framework for Recommendation", Association for the Advancement of Artificial Intelligence, 2018, 9 pages.
Zhu et al., "What to do Next: Modeling User Behaviors by Time-LSTM", Proceedings of the Twenty-Sixth International Joint Conference on Artificial Intelligence (IJCAI-17), pp. 3602-3608.

\* cited by examiner

METHOD, SYSTEM, AND COMPUTER PROGRAM PRODUCT FOR RECURRENT NEURAL NETWORKS FOR ASYNCHRONOUS SEQUENCES

CROSS REFERENCE TO RELATED APPLICATION

This application claims priority to U.S. Patent Application No. 63/107,064, filed Oct. 29, 2020, the disclosure of which is hereby incorporated by reference in its entirety.

BACKGROUND

1. Field

This disclosed subject matter relates generally to methods, systems, and products for recurrent neural networks and, in some particular embodiments or aspects, to a method, system, and computer program product for recurrent neural networks for asynchronous sequences of data.

2. Technical Considerations

Certain machine learning models may receive multiple sequences of data that are asynchronous and/or that are of different types. For example, in a healthcare setting, different sequences of data may describe different physiological parameters of a patient (e.g., temperature, heartbeats, heart rate, and/or the like), and each sequence of data may include data items that arrive asynchronously (e.g., at different times and/or frequencies with respect to the other sequences of data). In a fraud detection setting, different sequences of data may describe different events and/or messages associated therewith (e.g., transactions, authorization requests, authorization responses, authorizations, denials, clearing messages, settlement messages, and/or the like), and each sequence of data may include data items that arrive asynchronously. In a product recommendation setting, different sequences of data may describe different events (e.g., viewing an item, adding an item to a digital shopping cart, removing an item from a digital shopping cart, purchasing an item, and/or the like), and each sequence of data may include data items that arrive asynchronously.

However, it can be difficult for a machine learning model to use data of different types and/or that arrives asynchronously as input. For example, a recurrent neural network (RNN) may serially process each data item as input and/or update the state (e.g., hidden state and/or the like) of the RNN based on each data item. However, this restricts the ability of the RNN to treat data items of different types (e.g., from asynchronous sequences) differently. Additionally or alternatively, maintaining a single hidden state representative of all types of input data items may be inadequate (e.g., inaccurate and/or the like). Additionally or alternatively, such an RNN may be unable to learn interactions (e.g., interrelationships and/or the like) between the different sequences of data.

SUMMARY

Accordingly, it is an object of the presently disclosed subject matter to provide methods, systems, and computer program products for recurrent neural networks for asynchronous sequences of data.

According to non-limiting embodiments or aspects, provided is a method for recurrent neural networks for asynchronous sequences of data. In some non-limiting embodiments or aspects, a method for recurrent neural networks for asynchronous sequences of data may include receiving, with at least one processor, first input data associated with a plurality of first data items ordered in a first sequence and second input data associated with a plurality of second data items ordered in a second sequence, each first data item of the plurality of first data items associated with a respective first event of a first type, each second data item of the plurality of second data items associated with a respective second event of a second type different than the first type; for each respective data item of the plurality of first data items and the plurality of second data items: inputting, with the at least one processor, the respective data item and an indicator associated with a respective type of the respective data item to a recurrent unit of a recurrent neural network (RNN), the respective type comprising one of the first type or the second type; determining, with the at least one processor, a respective portion of a hidden state based on the indicator; and updating, with the at least one processor, the respective portion of the hidden state based on the respective data item and the indicator.

In some non-limiting embodiments or aspects, determining the respective portion of the hidden state comprises: splitting the hidden state into a first portion of the hidden state associated with the first type and a second portion of the hidden state associated with the second type; and selecting the first portion of the hidden state or the second portion of the hidden state based on the indicator.

In some non-limiting embodiments or aspects, the indicator comprises at least one of a Boolean flag, a bit, or any combination thereof.

In some non-limiting embodiments or aspects, determining the respective portion of the hidden state comprises: splitting the hidden state into a plurality of hidden state segments, each hidden state segment of the plurality of hidden state segments comprising a matrix, at least one of the plurality of hidden state segments comprising the respective portion of the hidden state; updating each hidden state segment of the plurality of hidden state segments based on an attention mechanism; and combining the plurality of hidden state segments as updated to provide the hidden state as updated.

In some non-limiting embodiments or aspects, splitting the hidden state into the plurality of hidden state segments comprises splitting the hidden state into the plurality of hidden state segments based on a number of types.

In some non-limiting embodiments or aspects, the indicator comprises a slice of each flag tensor of a plurality of flag tensors, the plurality of flag tensors comprising a query flag tensor, a key flag tensor, and a value flag tensor. Additionally or alternatively, updating each hidden state segment based on the attention mechanism comprises: concatenating each hidden state segment with each of a plurality of flag vectors from each slice of each flag tensor; determining at least one query vector, at least one key vector, and at least one value vector based on the hidden state segments having the flag vectors concatenated therewith; and updating each hidden state segment of the plurality of hidden state segments based on the at least one query vector, the at least one key vector, and the at least one value vector.

In some non-limiting embodiments or aspects, the method further comprises: determining, with the at least one processor, at least one prediction based on the hidden state as updated.

According to non-limiting embodiments or aspects, provided is a system for recurrent neural networks for asynchronous sequences of data. In some non-limiting embodiments or aspects, the system for recurrent neural networks for asynchronous sequences of data may include at least one processor and at least one non-transitory computer-readable medium including one or more instructions that, when executed by the at least one processor, direct the at least one processor to receive first input data associated with a plurality of first data items ordered in a first sequence and second input data associated with a plurality of second data items ordered in a second sequence, each first data item of the plurality of first data items associated with a respective first event of a first type, each second data item of the plurality of second data items associated with a respective second event of a second type different than the first type; for each respective data item of the plurality of first data items and the plurality of second data items: input the respective data item and an indicator associated with a respective type of the respective data item to a recurrent unit of an RNN, the respective type comprising one of the first type or the second type; determine a respective portion of a hidden state based on the indicator; and update the respective portion of the hidden state based on the respective data item and the indicator.

In some non-limiting embodiments or aspects, determining the respective portion of the hidden state comprises: splitting the hidden state into a first portion of the hidden state associated with the first type and a second portion of the hidden state associated with the second type; and selecting the first portion of the hidden state or the second portion of the hidden state based on the indicator.

In some non-limiting embodiments or aspects, the indicator comprises at least one of a Boolean flag, a bit, or any combination thereof.

In some non-limiting embodiments or aspects, determining the respective portion of the hidden state comprises: splitting the hidden state into a plurality of hidden state segments, each hidden state segment of the plurality of hidden state segments comprising a matrix, at least one of the plurality of hidden state segments comprising the respective portion of the hidden state; updating each hidden state segment of the plurality of hidden state segments based on an attention mechanism; and combining the plurality of hidden state segments as updated to provide the hidden state as updated.

In some non-limiting embodiments or aspects, splitting the hidden state into the plurality of hidden state segments comprises splitting the hidden state into the plurality of hidden state segments based on a number of types.

In some non-limiting embodiments or aspects, the indicator comprises a slice of each flag tensor of a plurality of flag tensors, the plurality of flag tensors comprising a query flag tensor, a key flag tensor, and a value flag tensor. Additionally or alternatively, updating each hidden state segment based on the attention mechanism comprises: concatenating each hidden state segment with each of a plurality of flag vectors from each slice of each flag tensor; determining at least one query vector, at least one key vector, and at least one value vector based on the hidden state segments having the flag vectors concatenated therewith; and updating each hidden state segment of the plurality of hidden state segments based on the at least one query vector, the at least one key vector, and the at least one value vector.

In some non-limiting embodiments or aspects, the one or more instructions, when executed by the at least one processor, further direct the at least one processor to: determine at least one prediction based on the hidden state as updated.

According to non-limiting embodiments or aspects, provided is a computer program product for recurrent neural networks for asynchronous sequences of data. The computer program product may include at least one non-transitory computer-readable medium including one or more instructions that, when executed by at least one processor, cause the at least one processor to receive first input data associated with a plurality of first data items ordered in a first sequence and second input data associated with a plurality of second data items ordered in a second sequence, each first data item of the plurality of first data items associated with a respective first event of a first type, each second data item of the plurality of second data items associated with a respective second event of a second type different than the first type; for each respective data item of the plurality of first data items and the plurality of second data items: input the respective data item and an indicator associated with a respective type of the respective data item to a recurrent unit of an RNN, the respective type comprising one of the first type or the second type; determine a respective portion of a hidden state based on the indicator; and update the respective portion of the hidden state based on the respective data item and the indicator.

In some non-limiting embodiments or aspects, determining the respective portion of the hidden state comprises: splitting the hidden state into a first portion of the hidden state associated with the first type and a second portion of the hidden state associated with the second type; and selecting the first portion of the hidden state or the second portion of the hidden state based on the indicator. In some non-limiting embodiments or aspects, the indicator comprises at least one of a Boolean flag, a bit, or any combination thereof.

In some non-limiting embodiments or aspects, determining the respective portion of the hidden state comprises: splitting the hidden state into a plurality of hidden state segments, each hidden state segment of the plurality of hidden state segments comprising a matrix, at least one of the plurality of hidden state segments comprising the respective portion of the hidden state; updating each hidden state segment of the plurality of hidden state segments based on an attention mechanism; and combining the plurality of hidden state segments as updated to provide the hidden state as updated.

In some non-limiting embodiments or aspects, splitting the hidden state into the plurality of hidden state segments comprises splitting the hidden state into the plurality of hidden state segments based on a number of types.

In some non-limiting embodiments or aspects, the indicator comprises a slice of each flag tensor of a plurality of flag tensors, the plurality of flag tensors comprising a query flag tensor, a key flag tensor, and a value flag tensor. Additionally or alternatively, updating each hidden state segment based on the attention mechanism comprises: concatenating each hidden state segment with each of a plurality of flag vectors from each slice of each flag tensor; determining at least one query vector, at least one key vector, and at least one value vector based on the hidden state segments having the flag vectors concatenated therewith; and updating each hidden state segment of the plurality of hidden state segments based on the at least one query vector, the at least one key vector, and the at least one value vector.

In some non-limiting embodiments or aspects, the one or more instructions, when executed by the at least one processor, further cause the at least one processor to: determine at least one prediction based on the hidden state as updated.

Further embodiments or aspects are set forth in the following numbered clauses:

Clause 1: A computer-implemented method, comprising: receiving, with at least one processor, first input data associated with a plurality of first data items ordered in a first sequence and second input data associated with a plurality of second data items ordered in a second sequence, each first data item of the plurality of first data items associated with a respective first event of a first type, each second data item of the plurality of second data items associated with a respective second event of a second type different than the first type; for each respective data item of the plurality of first data items and the plurality of second data items: inputting, with the at least one processor, the respective data item and an indicator associated with a respective type of the respective data item to a recurrent unit of an RNN, the respective type comprising one of the first type or the second type; determining, with the at least one processor, a respective portion of a hidden state based on the indicator; and updating, with the at least one processor, the respective portion of the hidden state based on the respective data item and the indicator.

Clause 2: The method of clause 1, wherein determining the respective portion of the hidden state comprises: splitting the hidden state into a first portion of the hidden state associated with the first type and a second portion of the hidden state associated with the second type; and selecting the first portion of the hidden state or the second portion of the hidden state based on the indicator.

Clause 3: The method of any preceding clause, wherein the indicator comprises at least one of a Boolean flag, a bit, or any combination thereof.

Clause 4: The method of any preceding clause, wherein determining the respective portion of the hidden state comprises: splitting the hidden state into a plurality of hidden state segments, each hidden state segment of the plurality of hidden state segments comprising a matrix, at least one of the plurality of hidden state segments comprising the respective portion of the hidden state; updating each hidden state segment of the plurality of hidden state segments based on an attention mechanism; and combining the plurality of hidden state segments as updated to provide the hidden state as updated.

Clause 5: The method of any preceding clause, wherein splitting the hidden state into the plurality of hidden state segments comprises splitting the hidden state into the plurality of hidden state segments based on a number of types.

Clause 6: The method of any preceding clause, wherein the indicator comprises a slice of each flag tensor of a plurality of flag tensors, the plurality of flag tensors comprising a query flag tensor, a key flag tensor, and a value flag tensor, and wherein updating each hidden state segment based on the attention mechanism comprises: concatenating each hidden state segment with each of a plurality of flag vectors from each slice of each flag tensor; determining at least one query vector, at least one key vector, and at least one value vector based on the hidden state segments having the flag vectors concatenated therewith; and updating each hidden state segment of the plurality of hidden state segments based on the at least one query vector, the at least one key vector, and the at least one value vector.

Clause 7: The method of any preceding clause, further comprising: determining, with the at least one processor, at least one prediction based on the hidden state as updated.

Clause 8: A system, comprising: at least one processor; and at least one non-transitory computer-readable medium including one or more instructions that, when executed by the at least one processor, direct the at least one processor to: receive first input data associated with a plurality of first data items ordered in a first sequence and second input data associated with a plurality of second data items ordered in a second sequence, each first data item of the plurality of first data items associated with a respective first event of a first type, each second data item of the plurality of second data items associated with a respective second event of a second type different than the first type; for each respective data item of the plurality of first data items and the plurality of second data items: input the respective data item and an indicator associated with a respective type of the respective data item to a recurrent unit of an RNN, the respective type comprising one of the first type or the second type; determine a respective portion of a hidden state based on the indicator; and update the respective portion of the hidden state based on the respective data item and the indicator.

Clause 9: The system of clause 8, wherein determining the respective portion of the hidden state comprises: splitting the hidden state into a first portion of the hidden state associated with the first type and a second portion of the hidden state associated with the second type; and selecting the first portion of the hidden state or the second portion of the hidden state based on the indicator.

Clause 10: The system of clauses 8 or 9, wherein the indicator comprises at least one of a Boolean flag, a bit, or any combination thereof.

Clause 11: The system of any one of clauses 8-10, wherein determining the respective portion of the hidden state comprises: splitting the hidden state into a plurality of hidden state segments, each hidden state segment of the plurality of hidden state segments comprising a matrix, at least one of the plurality of hidden state segments comprising the respective portion of the hidden state; updating each hidden state segment of the plurality of hidden state segments based on an attention mechanism; and combining the plurality of hidden state segments as updated to provide the hidden state as updated.

Clause 12: The system of any one of clauses 8-11, wherein splitting the hidden state into the plurality of hidden state segments comprises splitting the hidden state into the plurality of hidden state segments based on a number of types.

Clause 13: The system of any one of clauses 8-12, wherein the indicator comprises a slice of each flag tensor of a plurality of flag tensors, the plurality of flag tensors comprising a query flag tensor, a key flag tensor, and a value flag tensor, and wherein updating each hidden state segment based on the attention mechanism comprises: concatenating each hidden state segment with each of a plurality of flag vectors from each slice of each flag tensor; determining at least one query vector, at least one key vector, and at least one value vector based on the hidden state segments having the flag vectors concatenated therewith; and updating each hidden state segment of the plurality of hidden state segments based on the at least one query vector, the at least one key vector, and the at least one value vector.

Clause 14: The system of any one of clauses 8-13, wherein the one or more instructions, when executed by the at least one processor, further direct the at least one processor to: determine at least one prediction based on the hidden state as updated.

Clause 15: A computer program product comprising at least one non-transitory computer-readable medium including one or more instructions that, when executed by at least one processor, cause the at least one processor to: receive first input data associated with a plurality of first data items ordered in a first sequence and second input data associated with a plurality of second data items ordered in a second sequence, each first data item of the plurality of first data items associated with a respective first event of a first type, each second data item of the plurality of second data items associated with a respective second event of a second type different than the first type; for each respective data item of the plurality of first data items and the plurality of second data items: input the respective data item and an indicator associated with a respective type of the respective data item to a recurrent unit of an RNN, the respective type comprising one of the first type or the second type; determine a respective portion of a hidden state based on the indicator; and update the respective portion of the hidden state based on the respective data item and the indicator.

Clause 16: The computer program product of clause 15, wherein determining the respective portion of the hidden state comprises: splitting the hidden state into a first portion of the hidden state associated with the first type and a second portion of the hidden state associated with the second type; and selecting the first portion of the hidden state or the second portion of the hidden state based on the indicator, wherein the indicator comprises at least one of a Boolean flag, a bit, or any combination thereof.

Clause 17: The computer program product of clauses 15 or 16, wherein determining the respective portion of the hidden state comprises: splitting the hidden state into a plurality of hidden state segments, each hidden state segment of the plurality of hidden state segments comprising a matrix, at least one of the plurality of hidden state segments comprising the respective portion of the hidden state; updating each hidden state segment of the plurality of hidden state segments based on an attention mechanism; and combining the plurality of hidden state segments as updated to provide the hidden state as updated.

Clause 18: The computer program product of any one of clauses 15-17, wherein splitting the hidden state into the plurality of hidden state segments comprises splitting the hidden state into the plurality of hidden state segments based on a number of types.

Clause 19: The computer program product of any one of clauses 15-18, wherein the indicator comprises a slice of each flag tensor of a plurality of flag tensors, the plurality of flag tensors comprising a query flag tensor, a key flag tensor, and a value flag tensor, and wherein updating each hidden state segment based on the attention mechanism comprises: concatenating each hidden state segment with each of a plurality of flag vectors from each slice of each flag tensor; determining at least one query vector, at least one key vector, and at least one value vector based on the hidden state segments having the flag vectors concatenated therewith; and updating each hidden state segment of the plurality of hidden state segments based on the at least one query vector, the at least one key vector, and the at least one value vector.

Clause 20: The computer program product of any one of clauses 15-19, wherein the one or more instructions, when executed by the at least one processor, further cause the at least one processor to: determine at least one prediction based on the hidden state as updated.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

Figure 1:
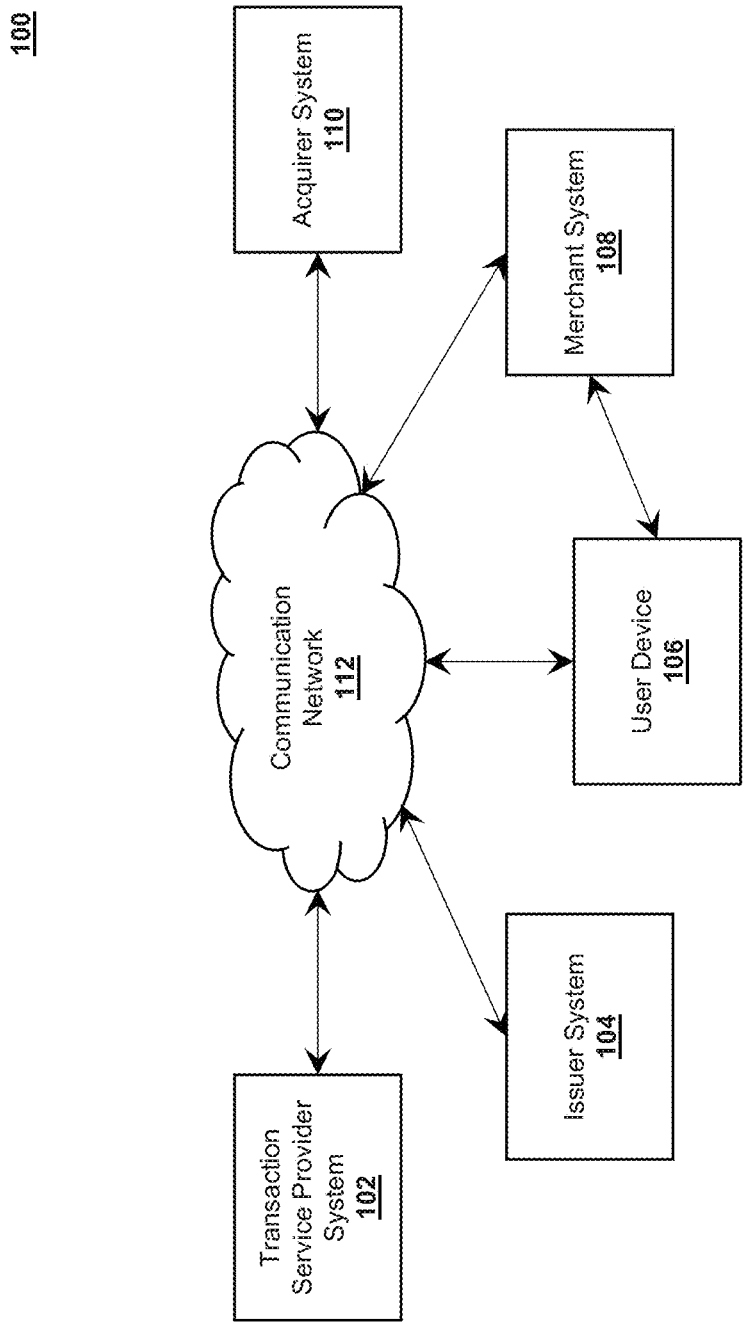
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments or aspects, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments or aspects of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the token requestor may be an application, a device, a process, or a system that is configured to perform actions associated with tokens. For example, a token requestor may request registration with a network token system, request token generation, token activation, token de-activation, token exchange, other token lifecycle management related processes, and/or any other token related processes. In some non-limiting embodiments or aspects, a token requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed bank identification numbers (BINs) as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for recurrent neural networks, including, but not limited to, recurrent neural networks for asynchronous sequences. For example, non-limiting embodiments or aspects of the disclosed subject matter provide receiving input data associated with data items of multiple different types (e.g., first type, second type, etc.) from multiple different sequences (e.g., first sequence, second sequence, etc.), and, for each respective data item, inputting the respective data item and an indicator associated with a respective type thereof to a recurrent unit of a recurrent neural network (RNN), determining at least one respective portion of a hidden state based on the indicator, and updating the respective portion(s) of the hidden state based on the respective data item and the indicator. Such embodiments provide techniques and systems that modify the structure of an RNN to enable handling of sequences of data that are asynchronous and/or of different types. Additionally or alternatively, such embodiments provide techniques and systems that improve the accuracy of an RNN with respect to sequences of data that are asynchronous and/or of different types. Additionally or alternatively, such embodiments provide techniques and systems that provide an unconventional combination of gated recurrent units (GRUs) and attention networks. Additionally or alternatively, such embodiments provide techniques and systems that allow for segmenting the hidden state of an RNN based on each type of input data (e.g., for sequences of data that are asynchronous and/or of different types). Additionally or alternatively, such embodiments provide techniques and systems that enable treating data items of different types (e.g., from asynchronous sequences) differently. Additionally or alternatively, such embodiments provide techniques and systems that enable learning interactions (e.g., interrelationships and/or the like) between the different sequences of data.

For the purpose of illustration, in the following description, while the presently disclosed subject matter is described with respect to methods, systems, and computer program products for recurrent neural networks, e.g., for asynchronous sequences, one skilled in the art will recognize that the disclosed subject matter is not limited to the illustrative embodiments or aspects. For example, the methods, systems, and computer program products described herein may be used with a wide variety of settings, such as recurrent neural networks in any setting suitable for using such recurrent neural networks, e.g., any application in which data items occur in a time sequence, such as healthcare, fraud detection, product recommendations, and/or the like.

Referring now to FIG. 1, FIG. 1 is a diagram of a non-limiting embodiment or aspect of an environment 100 in which systems, products, and/or methods, as described herein, may be implemented. As shown in FIG. 1, environment 100 includes transaction service provider system 102, issuer system 104, user device 106, merchant system 108, acquirer system 110, and communication network 112.

Transaction service provider system 102 may include one or more devices capable of receiving information from and/or communicating information to issuer system 104, user device 106, merchant system 108, and/or acquirer system 110 via communication network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, user device 106, merchant system 108, and/or acquirer system 110 via communication network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with user device 106.

User device 106 may include one or more devices capable of receiving information from and/or communicating information to transaction service provider system 102, issuer system 104, merchant system 108, and/or acquirer system 110 via communication network 112. Additionally or alternatively, each user device 106 may include a device capable of receiving information from and/or communicating information to other user devices 106 via communication network 112, another network (e.g., an ad hoc network, a local network, a private network, a virtual private network, and/or the like), and/or any other suitable communication technique. For example, user device 106 may include a client device and/or the like. In some non-limiting embodiments or aspects, user device 106 may or may not be capable of receiving information (e.g., from merchant system 108 or from another user device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, user device 106, and/or acquirer system 110 via communication network 112. Merchant system 108 may also include a device capable of receiving information from user device 106 via communication network 112, a communication connection (e.g., an NFC communication connection, an RFID communication connection, a Bluetooth® communication connection, a Zigbee® communication connection, and/or the like) with user device 106, and/or the like, and/or communicating information to user device 106 via communication network 112, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant, as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, user device 106, and/or merchant system 108 via communication network 112. For example, acquirer system 110 may include a computing device, a server, a group of servers, and/or the like. In some non-limiting embodiments or aspects, acquirer system 110 may be associated with an acquirer as described herein.

Communication network 112 may include one or more wired and/or wireless networks. For example, communication network 112 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., user device 106, a POS device of merchant system 108, and/or the like) may initiate the transaction, e.g., by generating an authorization request. Additionally or alternatively, the client device (e.g., user device 106, at least one device of merchant system 108, and/or the like) may communicate the authorization request. For example, user device 106 may communicate the authorization request to merchant system 108 and/or a payment gateway (e.g., a payment gateway of transaction service provider system 102, a third-party payment gateway separate from transaction service provider system 102, and/or the like). Additionally or alternatively, merchant system 108 (e.g., a POS device thereof) may communicate the authorization request to acquirer system 110 and/or a payment gateway. In some non-limiting embodiments or aspects, acquirer system 110 and/or a payment gateway may communicate the authorization request to transaction service provider system 102 and/or issuer system 104. Additionally or alternatively, transaction service provider system 102 may communicate the authorization request to issuer system 104. In some non-limiting embodiments or aspects, issuer system 104 may determine an authorization decision (e.g., authorize, decline, and/or the like) based on the authorization request. For example, the authorization request may cause issuer system 104 to determine the authorization decision based thereof. In some non-limiting embodiments or aspects, issuer system 104 may generate an authorization response based on the authorization decision. Additionally or alternatively, issuer system 104 may communicate the authorization response. For example, issuer system 104 may communicate the authorization response to transaction service provider system 102 and/or a payment gateway. Additionally or alternatively, transaction service provider system 102 and/or a payment gateway may communicate the authorization response to acquirer system 110, merchant system 108, and/or user device 106. Additionally or alternatively, acquirer system 110 may communicate the authorization response to merchant system 108 and/or a payment gateway. Additionally or alternatively, a payment gateway may communicate the authorization response to merchant system 108 and/or user device 106. Additionally or alternatively, merchant system 108 may communicate the authorization response to user device 106. In some non-limiting embodiments or aspects, merchant system 108 may receive (e.g., from acquirer system 110 and/or a payment gateway) the authorization response. Additionally or alternatively, merchant system 108 may complete the transaction based on the authorization response (e.g., provide, ship, and/or deliver goods and/or services associated with the transaction; fulfill an order associated with the transaction; any combination thereof; and/or the like).

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
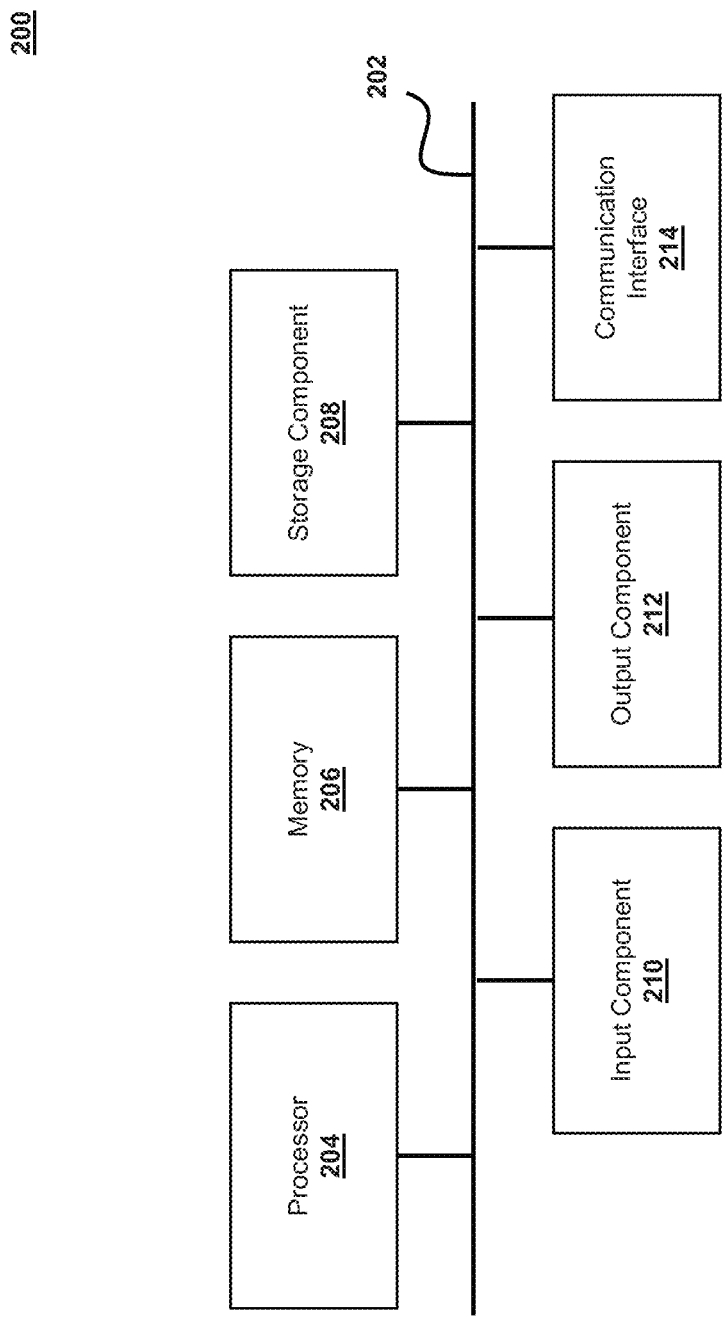
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of transaction service provider system 102, one or more devices of issuer system 104, user device 106, one or more devices of merchant system 108, and/or one or more devices of acquirer system 110. In some non-limiting embodiments or aspects, transaction service provider system 102, issuer system 104, user device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
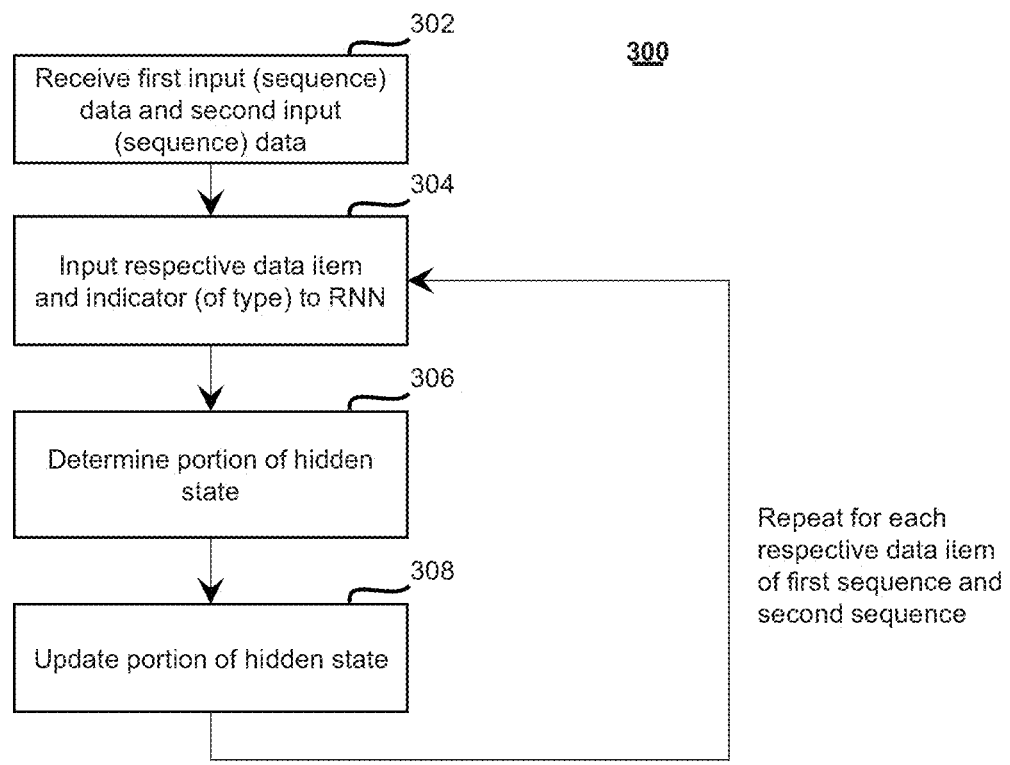
FIG. 3 is a flowchart of a non-limiting embodiment or aspect of a process for recurrent neural networks for asynchronous sequences of data according to the principles of the presently disclosed subject matter.

Referring now to FIG. 3, shown is a process 300 for recurrent neural networks for asynchronous sequences of data according to some non-limiting embodiments or aspects. The steps shown in FIG. 3 are for example purposes only. It will be appreciated that additional, fewer, different, and/or a different order of steps may be used in non-limiting embodiments or aspects. In some non-limiting embodiments or aspects, one or more of the steps of process 300 may be performed (e.g., completely, partially, and/or the like) by transaction service provider system 102 (e.g., one or more devices of transaction service provider system 102). In some non-limiting embodiments or aspects, one or more of the steps of a process for an RNN for asynchronous sequences of data may be performed (e.g., completely, partially, and/or the like) by another system, another device, another group of systems, or another group of devices, separate from or including transaction service provider system 102, such as issuer system 104 (e.g., one or more devices of issuer system 104), user device 106, merchant system 108 (e.g., one or more devices of merchant system 108), acquirer system 110 (e.g., one or more devices of acquirer system 110), any combination thereof, and/or the like. In some non-limiting embodiments or aspects, with reference to FIG. 3, an RNN system may include at least one computing device. Additionally or alternatively, the RNN system may be part of transaction service provider system 102 or another system, device, group of systems, or group of devices separate from or including transaction service provider system 102, such as issuer system 104, user device 106, merchant system 108, acquirer system 110, any combination thereof, and/or the like.

As shown in FIG. 3, at step 302, process 300 may include receiving input data. For example, an RNN system may receive input data associated with data items of multiple different types (e.g., first type, second type, etc.) from multiple different sequences (e.g., first sequence, second sequence, etc.). In some non-limiting embodiments or aspects, the RNN system may receive first input data associated with a plurality of first data items ordered in a first sequence and second input data associated with a plurality of second data items ordered in a second sequence. Additionally or alternatively, each first data item of the plurality of first data items may be associated with a respective first event of a first type, and/or each second data item of the plurality of second data items may be associated with a respective second event of a second type different than the first type.

Figure 4A:
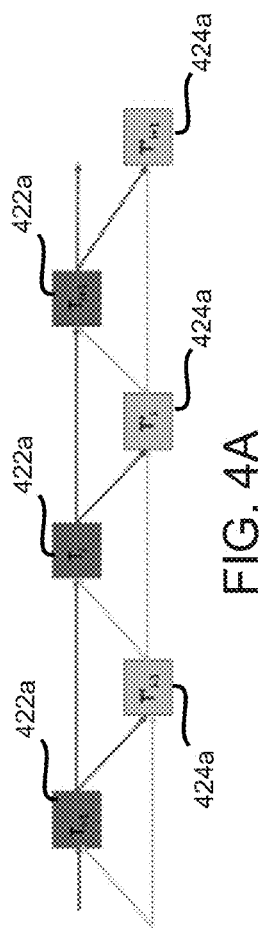
FIGS. 4A-4C are diagrams of non-limiting embodiments or aspects of asynchronous sequences of data items according to the principles of the presently disclosed subject matter.
Figure 4B:
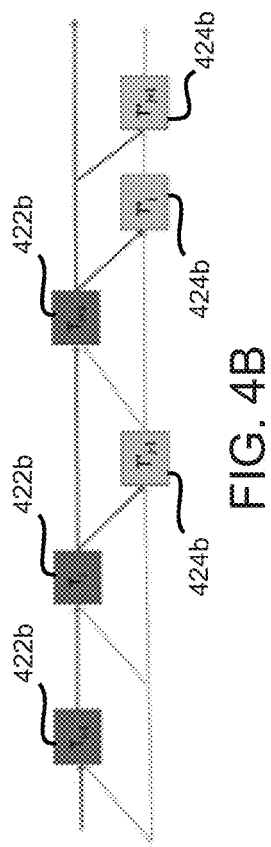
Figure 4C:
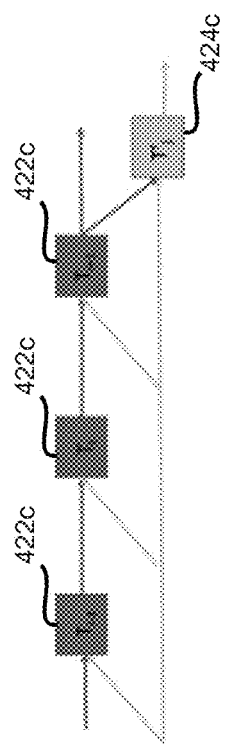

For the purpose of illustration, with reference to FIGS. 4A-4C, and with continued reference to FIG. 3, FIGS. 4A-4C show exemplary asynchronous sequences of data items according to non-limiting embodiments or aspects. For example, as shown in FIG. 4A, a plurality of first data items 422a are ordered in a first sequence with timestamps $T_{i-1}$, $T_i$, and $T_{i+1}$. A plurality of second data items 424a are ordered in a second sequence with timestamps $T'_{i-1}$, $T'_i$, and $T'_{i+1}$. In some non-limiting embodiments or aspects, as shown in FIG. 4A, the timestamps for the second data items 424a (e.g., $T'_{i-1}$, $T'_i$, and $T'_{i+1}$) may be slightly after the respective timestamp for the corresponding first data items 422a (e.g., $T_{i-1}$, $T_i$, and $T_{i+1}$, respectively). In other words, every first data item 422a in the first sequence may be followed by a data item 424a from the second sequence.

As shown in FIG. 4B, a plurality of first data items 422b are ordered in a first sequence with timestamps $T_{i-1}$, $T_i$, and $T_{i+1}$. A plurality of second data items 424b are ordered in a second sequence with timestamps $T'_{j-1}$, $T'_j$, and $T'_{j+1}$. In some non-limiting embodiments or aspects, as shown in FIG. 4B, the timestamps for the second data items 424b (e.g., $T'_{j-1}$, $T'_j$, and $T'_{j+1}$) may not necessarily be in any particular pattern with respect to the timestamps for the first data items 422a (e.g., $T_{i-1}$, $T_i$, and $T_{i+1}$). In other words, the first sequence may have the same length as the second sequence, but the order of first data items 422b in the first sequence may be independent of the order of the second data items 424b in the second sequence. For example, the timestamp $T'_{j-1}$ may be between timestamps $T_i$, and $T_{i+1}$, and both timestamps $T'_j$, and $T'_{j+1}$ may be after timestamp $T_{i+1}$.

As shown in FIG. 4C, a plurality of first data items 422c are ordered in a first sequence with timestamps $T_{i-1}$, $T_i$, and $T_{i+1}$. A second data item 424c may have a timestamp $T'_j$. In some non-limiting embodiments or aspects, as shown in FIG. 4C, the event corresponding to the second data item 424c (e.g., at timestamp $T'_j$) may not occur as frequently as the events corresponding to first data items 422c (e.g., at time stamps $T_{i-1}$, $T_i$, and $T_{i+1}$). In other words, the second sequence may have a slower rate than the first sequence.

With continued reference to FIGS. 4A-4C, in some non-limiting embodiments or aspects, in a healthcare setting, different sequences of data may describe different physiological parameters of a patient. For example, the first sequence may include first data items related to temperature and the second sequence may include second data items related to heartbeats (or heart rate) and/or the like. In some non-limiting embodiments or aspects, in a fraud detection setting, different sequences of data may describe different transaction events and/or messages associated therewith. For example, the first sequence may include first data items related to transaction messages (e.g., authorization requests) and the second sequence may include second data items related to feedback from the issuer (e.g., authorization responses, authorizations, denials, etc.) and/or the like. In some non-limiting embodiments or aspects, in a product recommendation setting, different sequences of data may describe different user behavior events. For example, the first sequence may include first data items related to viewing an item and the second sequence may include second data items related to acting upon an item (e.g., adding an item to a digital shopping cart, removing an item from the digital shopping card, purchasing an item, etc.) and/or the like.

Referring again to FIG. 3, as shown at step 304, process 300 may include inputting each respective data item (e.g., of the plurality of first data items, the plurality of second data items, and/or the like) with an indicator associated with a respective type thereof into an RNN. For example, the RNN system may input each respective data item and an indicator associated with a respective type of the respective data item to a recurrent unit of the RNN. Additionally or alternatively, the respective type may include one of the first type, the second type, and/or the like.

In some non-limiting embodiments or aspects, the RNN may include an asynchronous gated recurrent unit (AGRU). For example, the AGRU may be the same as or similar to the implementation described with respect to FIGS. 5A and 5B. In some non-limiting embodiments or aspects, the indicator may include at least one of a Boolean flag, a bit, or any combination thereof. In some non-limiting embodiments or aspects, the indicator may include a category (or an identifier thereof, such as a numeric identifier and/or the like). In some non-limiting embodiments or aspects, each respective data item and the respective indicator (e.g., flag or bit) may be inputted into the AGRU (e.g., by the RNN system).

In some non-limiting embodiments or aspects, the RNN may include a behavior-attentive gated recurrent unit (BAGRU). For example, the BAGRU may be the same as or similar to the implementation described with respect to FIGS. 6A and 6B. Additionally or alternatively, the BAGRU may be the same as or similar to the implementation described with respect to FIGS. 7A-7C. In some non-limiting embodiments or aspects, the indicator may include a slice of each flag tensor of a plurality of flag tensors. Additionally or alternatively, the plurality of flag tensors may include a query flag tensor, a key flag tensor, and a value flag tensor. In some non-limiting embodiments or aspects, each respective data item and the respective indicator (e.g., slice of the flag tensor) may be inputted into the BAGRU (e.g., by the RNN system).

With continued reference to FIG. 3, as shown at step 306, process 300 may include determining at least one respective portion of a hidden state based on the indicator for each respective data item. For example, the RNN system may determine a respective portion of a hidden state based on the indicator for each respective data item.

In some non-limiting embodiments or aspects, determining the respective portion of the hidden state may include splitting the hidden state into a first portion of the hidden state associated with the first type and a second portion of the hidden state associated with the second type. Additionally or alternatively, the first portion of the hidden state or the second portion of the hidden state may be selected based on the indicator. For the purpose of illustration, such splitting of the hidden state and selection of a portion of the hidden state may be the same as or similar to as described with respect to FIGS. 5A and 5B.

In some non-limiting embodiments or aspects, determining the respective portion of the hidden state may include splitting the hidden state into a plurality of hidden state segments. For example, each hidden state segment of the plurality of hidden state segments may include a matrix. Additionally or alternatively, at least one of the hidden state segments may include the respective portion of the hidden state. In some non-limiting embodiments or aspects, splitting the hidden state into the plurality of hidden state segments may include splitting the hidden state into the plurality of hidden state segments based on a number of types (e.g., of input data items). For the purpose of illustration, splitting of the hidden state into segments may be the same as or similar to as described with respect to FIGS. 6A and 6B or FIGS. 7A-7C.

With continued reference to FIG. 3, as shown at step 308, process 300 may include updating the respective portion of the hidden state based on the respective data item and the indicator. For example, the RNN system may update the respective portion of the hidden state based on the respective data item and the indicator.

In some non-limiting embodiments or aspects, for each respective data item, the portion of the hidden state of the AGRU corresponding to the respective indicator may be updated (e.g., by the RNN system) based on the respective data item. For the purpose of illustration, such updating may be the same as or similar to as described with respect to FIGS. 5A and 5B.

In some non-limiting embodiments or aspects, each hidden state segment may be updated (e.g., by the RNN system) based on an attention mechanism. Additionally or alternatively, the plurality of hidden state segments (as updated) may be combined to provide the hidden state as updated. For the purpose of illustration, such updating may be the same as or similar to as described with respect to FIGS. 6A and 6B or FIGS. 7A-7C. In some non-limiting embodiments or aspects, when the indicator includes a slice of each flag tensor, as described above, updating each hidden state segment based on the attention mechanism may include concatenating each hidden state segment with each of a plurality of flag vectors from each slice of each flag tensor. Additionally or alternatively, at least one query vector, at least one key vector, and at least one value vector may be determined based on the hidden state segments having the flag vectors concatenated therewith. Additionally or alternatively, each hidden state segment may be updated based on the query vector(s), the key vector(s), and/or the value vector(s).

In some non-limiting embodiments or aspects, the RNN system may determine at least one prediction based on the hidden state (as updated). For example, the RNN system may predict the next data item in a sequence (e.g., a next first data item in the first sequence and/or a next second data item in the second sequence) based on the hidden state (as updated). For the purpose of illustration, the prediction may be the same as or similar to as described with respect to FIGS. 7A-7C. In some non-limiting embodiments or aspects, in a healthcare setting, the prediction may include future physiological parameters of a patient. For example, the prediction may include a next temperature in a first sequence of temperatures or a next heartbeat in a second sequence of heartbeats, and/or the like. In some non-limiting embodiments or aspects, in a fraud detection setting, the prediction may include predicting a next transaction in a sequence of transactions (e.g., if the next actual transaction does not match the next predicted transaction, the next actual transaction may be a fraudulent transaction). In some non-limiting embodiments or aspects, in a product recommendation setting, the prediction may include one or more next items in a first sequence of viewed items (e.g., which item(s) the user would be likely to view next) or a next item in a second sequence of purchased items (e.g., which item(s) the user would be likely to purchase next). In some non-limiting embodiments or aspects, the items associated with the predicted next data items may be communicated to and/or displayed on a user device (e.g., 106) associated with a user.

Figure 5A:
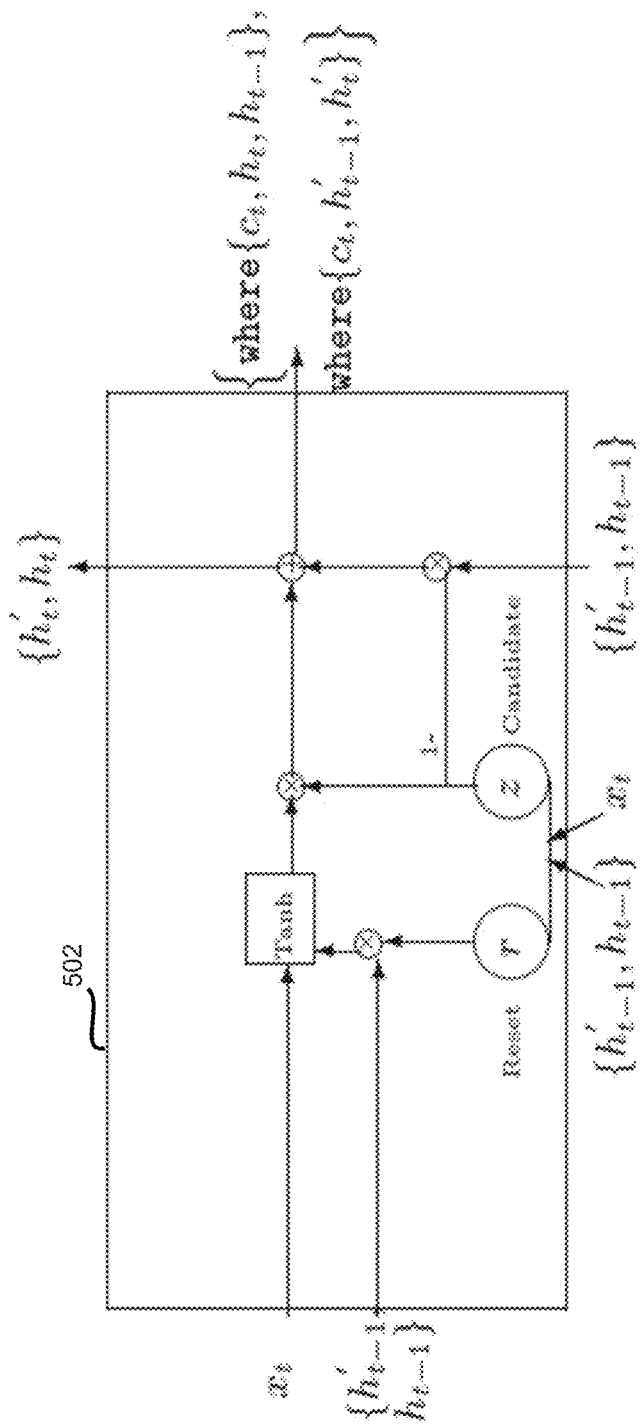
FIGS. 5A and 5B are diagrams of non-limiting embodiments or aspects of an implementation of a non-limiting embodiment or aspect of the process shown in FIG. 3 according to the principles of the presently disclosed subject matter.
Figure 5B:
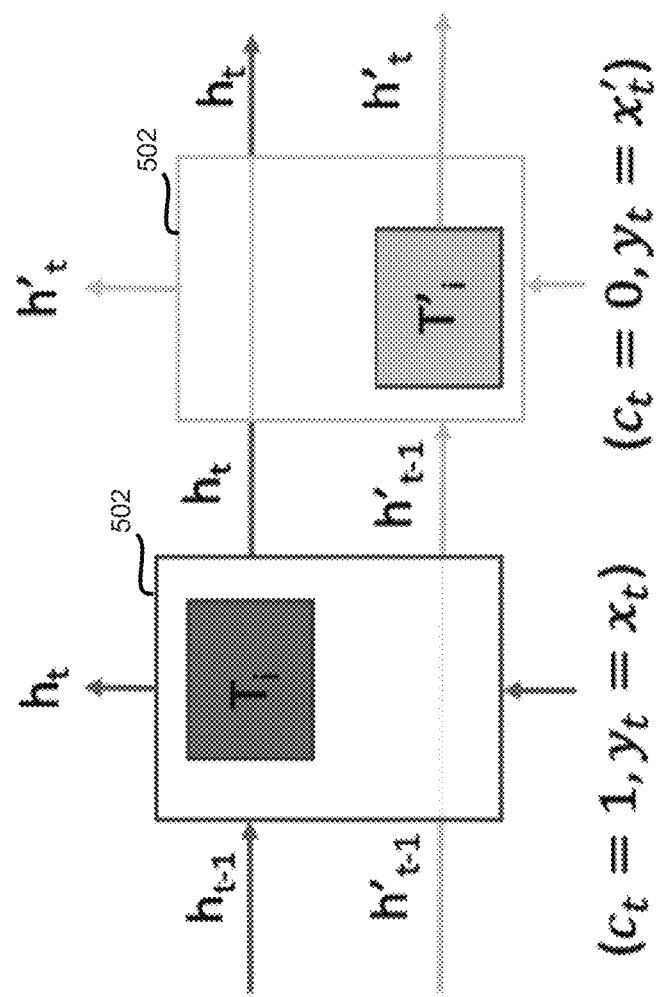

Referring now to FIGS. 5A and 5B, shown is an implementation 500 of an exemplary AGRU relating to process 300 shown in FIG. 3, according to some non-limiting embodiments or aspects. In some non-limiting embodiments or aspects, implementation 500 may be implemented by an RNN system, as described herein.

As shown in FIG. 5A, at a time step t, the respective data item $x_t$ and the respective indicator $c_t$ may be inputted to AGRU 502 (e.g., by an RNN system, as described herein). Additionally, the hidden state from the previous time step, which may include a first portion $h_{t-1}$ and a second portion $h'_{t-1}$, may be inputted to AGRU 502 (e.g., by an RNN system, as described herein). A respective portion of the hidden state to be updated may be determined based on the indicator $c_t$. For example, $c_t$ may be a Boolean flag, which may have a value of either 1 (corresponding to the first type of data item from the first sequence) or 0 (corresponding to the second type of data item from the second sequence). If the value of $c_t$ is 1, the first portion h of the hidden state may be updated (e.g., the RNN system may determine $h_t$ based on inputting $x_t$ and $h_{t-1}$ to the AGRU), and if the value of $c_t$ is 0, the second portion h' of the hidden state may be updated (e.g., the RNN system may determine $h'_t$ based on inputting $x_t$ and $h'_{t-1}$ to the AGRU).

For the purpose of illustration, as shown in FIG. 5B, a first data item $x_t$ from a first sequence may be associated with a first event type, which may have a respective value of 1 for the indicator $c_t$. A second data item $x'_t$ from a second sequence may be associated with a second event type, which may have a respective value of 0 for the indicator $c_t$. An RNN system may receive the first data item $x_t$ with the value of 1 for the indicator $c_t$ and the second data item $x'_t$ with the value of 0 for the indicator $c_t$. The RNN system may also receive and/or have stored thereon the hidden state from the previous time step, which may include a first portion $h_{t-1}$ and a second portion $h'_{t-1}$. The RNN system may input each respective data item $x_t$, $x'_t$, and the indicator $c_t$ value corresponding thereto (e.g., 1 or 0, respectively) to AGRU 502. The RNN system (e.g., AGRU 502 thereof) may determine a respective portion of the hidden state based on the indicator (e.g., a first portion $h_{t-1}$ corresponding to indicator $c_t$ value 1 and a second portion $h'_{t-1}$ corresponding to indicator $c_t$ value 1). For the first data item $x_t$, the RNN system (e.g., AGRU 502 thereof) may update the first portion $h_{t-1}$ of the hidden state based on first data item $x_t$ to generate the current first portion $h_t$ of the hidden state. For the second data item $x'_t$, the RNN system (e.g., AGRU 502 thereof) may update the second portion $h'_{t-1}$ of the hidden state based on second data item $x'_t$ to generate the current second portion $h'_t$ of the hidden state.

With continued reference to FIGS. 5A and 5B, each data item of each sequence may contribute to the hidden state. Additionally or alternatively, updates to the hidden state may depend of the type of data in the respective sequence (e.g., the indicator corresponding to the respective data item). As shown in FIG. 5B, the hidden state may be the combination of two portions of the hidden state (e.g., $h_t$ and $h'_t$), each of which may be current portions of the hidden state for the respective sequence (e.g., first sequence and second sequence, respectively). At each time step, only the portion of the hidden state belonging to that particular sequence associated with the input data item may be updated. For example, the indicator $c_t$ (e.g., a Boolean flag with a value of 1 or 0) may determine which sequence (e.g., which type of data) the respective data item belongs to, and only the respective portion (e.g., first portion $h_t$ or second portion $h'_t$) of the hidden state may be updated, while the other portion of the hidden state remains the same (e.g., is simply passed through AGRU 502).

With continued reference to FIG. 5A, the reset gate $r_t$ of AGRU 502 may receive the hidden state from the previous time step (e.g., first portion $h_{t-1}$ and second portion $h'_{t-1}$ of the hidden state) and the respective data item as input and may generate an output based on the following equation:

$$r_t = \text{sigmoid}(W_r y_t + U_r \text{ConCat}(h'_{t-1}, h_{t-1}) b_r),$$

where sigmoid( ) is a sigmoid activation function, ConCat( ) is a concatenation function, $W_r$ is a (trainable) parameter matrix, $U_r$ is a (trainable) parameter matrix, $b_r$ is a (trainable) bias vector, and $y_t$ is a half-zero input vector based on the respective data item $x_t$. For example, given the respective data item $x_t$ that is a vector of dimension n (e.g., $x_t \in \mathbb{R}^n$), $y_t$ may be a half-zero vector of either ConCat($x_t$, 0)

or ConCat(0, $x_t$) depending on the sequence (e.g., the indicator of the type of data) corresponding to $x_t$ (e.g., $c_t=1$ or $c_t=0$, respectively).

With continued reference to FIG. 5A, the candidate gate $z_t$ of AGRU 502 may receive the hidden state from the previous time step (e.g., first portion $h_{t-1}$ and second portion $h'_{t-1}$ of the hidden state) and the respective data item as input and may generate an output based on the following equation:

$$z_t=\text{sigmoid}(W_z y_t + U_z \text{ConCat}(h'_{t-1}, h_{t-1}) + b_z),$$

where $W_z$ is a (trainable) parameter matrix, $U_z$ is a (trainable) parameter matrix, $b_z$ is a (trainable) bias vector, and sigmoid( ), ConCat( ), and $y_t$ are as described above.

With continued reference to FIG. 5A, the candidate activation vector it (i.e., the block Tanh shown in FIG. 5A) of AGRU 502 may receive the hidden state from the previous time step (e.g., first portion $h_{t-1}$ and second portion $h'_{t-1}$ of the hidden state), the respective data item, and the output of the reset gate $r_t$ as input and may generate an output based on the following equation:

$$i_t=\tanh(W_h y_t + U_h(r_t \odot \text{ConCat}(h'_{t-1}, h_{t-1})) + b_h),$$

where tanh( ) is the hyperbolic tangent activation function, $W_h$ is a (trainable) parameter matrix, $U_h$ is a (trainable) parameter matrix, km is a (trainable) bias vector, and ConCat( ) and $y_t$ are as described above.

With continued reference to FIG. 5A, the hidden state for the current time step of AGRU 502 may be determined based on the hidden state from the previous time step (e.g., first portion $h_{t-1}$ and second portion $h'_{t-1}$ of the hidden state), the output of the candidate gate $z_t$, and the candidate activation vector it. For example, AGRU 502 may determine the hidden state for the current time step based on the following equation:

$$h'_t, h_t = \text{Split}((1-z_t) \odot h_{t-1} + z_t \odot i_t),$$

where Split( ) is a split function to split the hidden state into the first and second portions. Because $z_t$ and it are based on $y_t$, which is half-zero, this equation may result in only updating one of the first portion $h_t$ or the second portion $h'_t$, and the other one of these portions that is not updated may simply continue to be equal to what it was as the last time step (e.g., $h_{t-1}$ or $h'_{t-1}$). This may be accomplished via the where( ) function, which is a tensor indexing operator in which the first argument determines whether the second or third argument is returned, as follows:

$$h_t = \text{where}(c_t, h_t, h_{t-1}),$$

$$h'_t = \text{where}(c_t, h'_{t-1}, h'_t).$$

In some non-limiting embodiments or aspects, AGRU 502 may determine the different portions of the hidden state in parallel. For example, additional and redundant computations may be performed in parallel to the desired computations to enable such parallel processing. For example, because $y_t$ is half-zero, matrix multiplication for computation for the data items of the first type related to the first portion $h_t$ will result in half the resulting matrix (corresponding to the second portion $h'_t$) being equal to zero. Thus, computations associated with the first portion $h_t$ may be performed independent of (and in parallel with) computations associated with the second portion $h'_t$.

Figure 6A:
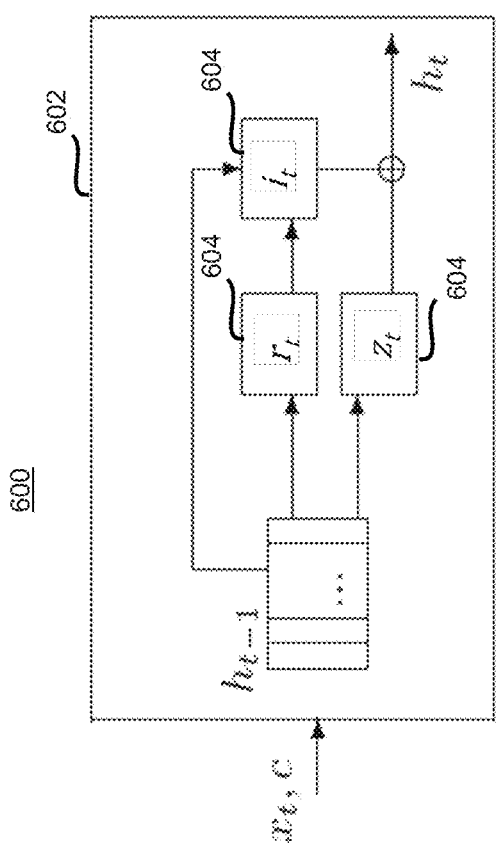
FIGS. 6A and 6B are diagrams of non-limiting embodiments or aspects of an implementation of a non-limiting embodiment or aspect of the process shown in FIG. 3 according to the principles of the presently disclosed subject matter.
Figure 6B:
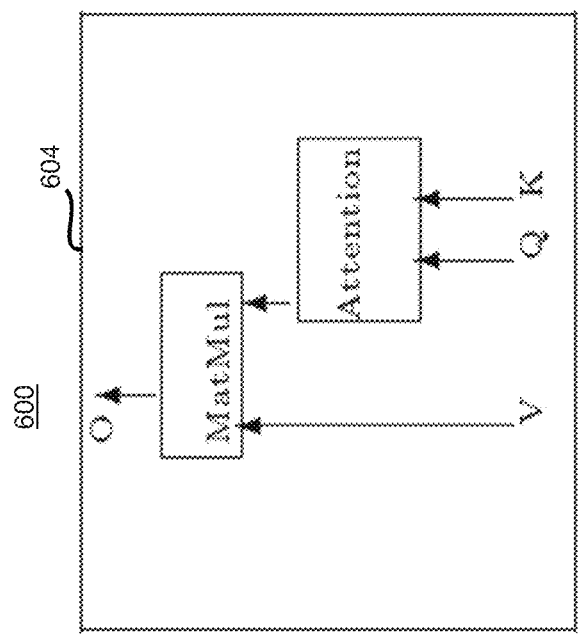

Referring now to FIGS. 6A and 6B, shown is an implementation 600 of an exemplary BAGRU relating to process 300 shown in FIG. 3, according to some non-limiting embodiments or aspects. In some non-limiting embodiments or aspects, implementation 600 may be implemented by an RNN system, as described herein.

As shown in FIG. 6A, at a time step t, the respective data item $x_t$ and the respective indicator c may be inputted to BAGRU 602 (e.g., by an RNN system, as described herein). Additionally, the hidden state from the previous time step $h_{t-1}$ may be inputted to BAGRU 602 (e.g., by an RNN system, as described herein). For notation purposes, the hidden state from the previous time step $h_{t-1}$ may also be referred to as H and/or the indicator c may also be referred to as a flag tensor F (or a portion thereof). The hidden state from the previous time step may have N segments corresponding to the number of types of data items (e.g., if there are two types of data items, N=2). As such, the full hidden state H may include all segments 1-N (i.e., $H^1, H^2, \ldots, H^N$). In some non-limiting embodiments or aspects, there may be dependence across segments (e.g., $H^i | H^j \forall 1 \le i, j \le N$), and this dependence may be incorporated into (e.g., taken into account by) attention subsystems 604, as further described below.

In some non-limiting embodiments or aspects, a flag tensor F may be defined as a tensor with dimensions N×N×d (e.g., $F \in \mathbb{R}^{N \times N \times d}$). A kth slide slice $F^{k,:,:}$ of the flag tensor F may be selected based on the type of the data item (e.g., the indicator may include such slice of each flag tensor). Additionally or alternatively, the ith vector $F^{k,i,:}$ in the kth slice $F^{k,:,:}$ may be selected to be appended to $H^i$. As such, the multi-layer configuration of the flag tensor may enforce individual types of data items (e.g., user behaviors) into specific portions of the hidden state and/or ensure no segments are identical to each other. In some non-limiting embodiments or aspects, three of these flag tensors may be allocated for queries, keys, and values (e.g., a query flag tensor $F_q$, a key flag tensor $F_k$, and a value flag tensor $F_v$).

For the purpose of illustration, as shown in FIG. 6B, attention subsystem 604 may receive the hidden state (from the previous time step) H and the respective data item $x_t$ as input. For example, the RNN system may input the hidden state H and the data item $x_t$ to attention subsystem 604 (which may be a part of the RNN system). Attention subsystem 604 may split the hidden state H into a selected number L of hidden state segments. For example, this may be accomplished using the Split( ) function as follows: $H^{1 \cdots N} = \text{Split}(H, L)$.

For example, L may be equal to N. As such, the hidden state H may be split into N segments, e.g., $H^1, H^2, \ldots, H^N$. In some non-limiting embodiments or aspects, each hidden state segment may include a matrix.

With continued reference to FIG. 6B, in some non-limiting embodiments or aspects, for a type c of data item, attention subsystem 604 may append the ith vector of the cth slice of the query, key, and value flag tensors ($F_q$, $F_k$, and $F_v$) to the ith segment of the hidden state H and the respective data item $x_t$ to form appended segments. For example, this may be accomplished based on the following equation:

$$H_{q,k,v}^i = \text{ConCat}(H^i, x_t, F_{q,k,v}^i).$$

Additionally, attention subsystem 604 may multiply these appended segments by a respective (trainable) weight matrix (e.g., $W_q$, $W_k$, and $W_v$) to form query (Q), key (K), and value (V) matrices. (In some non-limiting embodiments, one of these matrices, such as value matrix V may also include a bias vector by). For example, this may be accomplished based on the following equation:

$$Q, K, V = H_q W_q, H_k W_k, H_v W_v + b_v.$$

With continued reference to FIG. 6B, in some non-limiting embodiments or aspects, attention subsystem 604 may determine the jth segment $O_j$ of an output O based on the jth segment of the query, key, and value matrices. For example, this may be accomplished based on the following equation:

$$O_j = \text{Softmax}(Q_j K_j^T) V_j,$$

where Softmax( ) is the softmax activation function and T is the transpose operator. Additionally, attention subsystem 604 may determine the full output O by concatenating the m segments thereof. For example, this may be accomplished based on the following equation:

$$O = \text{ConCat}(O_{1 \ldots m}).$$

Referring again to FIG. 6A, BAGRU 602 may allocate (e.g., include) three attention subsystems 604 (e.g., $SA_z$, $SA_r$, and $SA_i$) for the candidate gate $z_t$, the reset gate $r_t$, and the candidate activation gate $i_t$, respectively. As such, the candidate gate $z_t$ of BAGRU 602 may receive the hidden state from the previous time step $h_{t-1}$ and the respective data item $x_t$ as input and may generate an output based on the following equation:

$$z_t = \text{sigmoid}(SA_z(h_{t-1}, x_t)).$$

With continued reference to FIG. 6A, the reset gate $r_t$ of BAGRU 602 may receive the hidden state from the previous time step $h_{t-1}$ and the respective data item $x_t$ as input and may generate an output based on the following equation:

$$r_t = \text{sigmoid}(SA_r(h_{t-1}, x_t)).$$

With continued reference to FIG. 6A, the candidate activation gate $i_t$ of BAGRU 602 may receive the hidden state from the previous time step $h_{t-1}$, the respective data item $x_t$, and the output of the reset gate $r_t$ as input and may generate an output based on the following equation:

$$i_t = \tanh(SA_i(r_t \odot h_{t-1}, x_t)).$$

With continued reference to FIG. 6A, the hidden state for the current time step $h_t$ of BAGRU 602 may be determined (e.g., by the RNN system) based on the hidden state from the previous time step $h_{t-1}$, the output of the candidate gate $z_t$, and the output of the candidate activation gate $i_t$. For example, this may be accomplished based on the following equation:

$$h_t = (1 - z_t) \odot h_{t-1} + z_t \odot i_t.$$

Figure 7A:
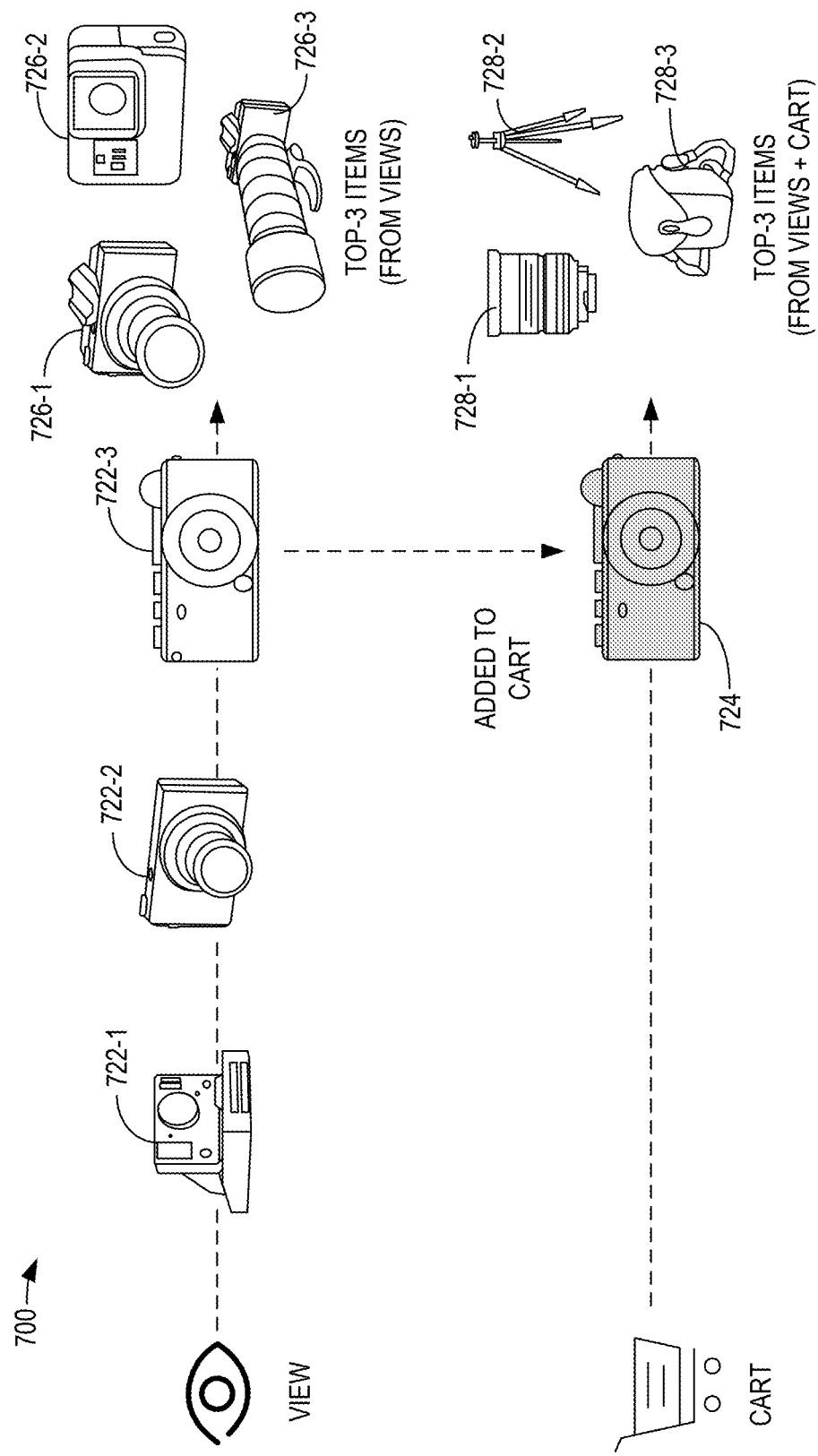
FIGS. 7A-7C are diagrams of non-limiting embodiments or aspects of an implementation of a non-limiting embodiment or aspect of the process shown in FIG. 3 according to the principles of the presently disclosed subject matter.
Figure 7B:
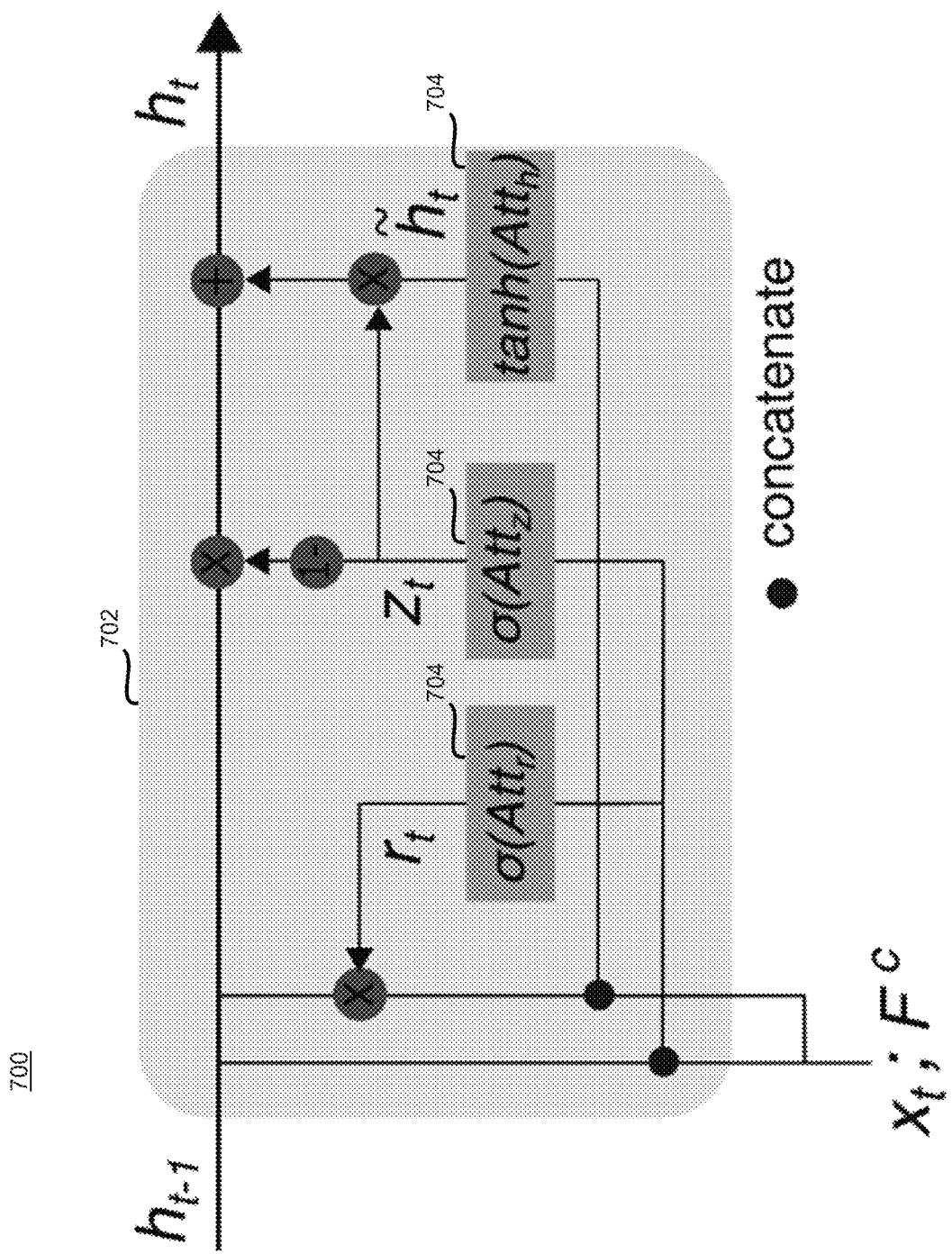
Figure 7C:
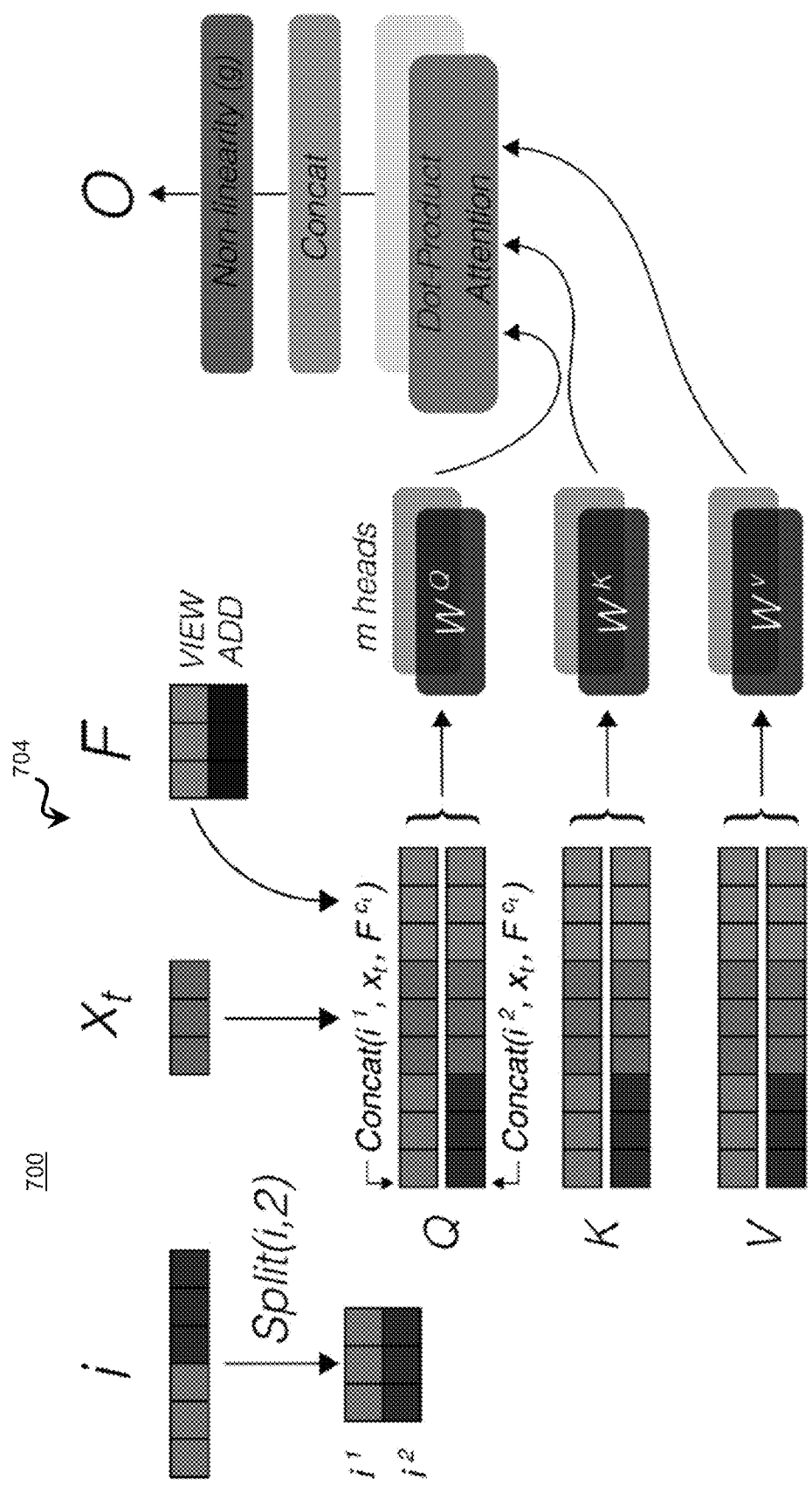

Referring now to FIGS. 7A-7C, shown is an implementation 700 of an exemplary BAGRU relating to process 300 shown in FIG. 3, according to some non-limiting embodiments or aspects. In some non-limiting embodiments or aspects, implementation 700 may be implemented by an RNN system, as described herein.

For the purpose of illustration, with reference to FIG. 7A, shown is an exemplary asynchronous sequence of data items according to non-limiting embodiments or aspects. For example, as shown in FIG. 7A, a plurality of first data items 722-1 through 722-3 (collectively, data items 722) are ordered in a first sequence. Data items 722 may represent viewing events associated with different products that a user viewed (e.g., using user device 106) during a visit to a website. As shown in FIG. 7A, a user may have viewed a polaroid camera (e.g., a first viewing event represented by first data item 722-1), a compact camera (e.g., a second viewing event represented by second data item 722-2), and a mirrorless camera (e.g., a third viewing event represented by third data item 722-3). At least one second data item 724 may be ordered in a second sequence. Data item(s) 724 may represent cart-adding events associated with one or more products that a user added to a digital shopping cart (e.g., using user device 106) during the visit to the website. As shown in FIG. 7A, a user may have added the polaroid camera to the digital shopping cart (e.g., a first cart-adding event represented by second data item 724). In some non-limiting embodiments or aspects, an RNN system may determine and/or update a hidden state h (or a portion thereof) based on each respective data item (e.g., each of first data items 722 and/or second data item 724) and/or an indicator (e.g., at least a portion of a flag tensor F), as described herein. Additionally or alternatively, the RNN system may determine at least one prediction based on the hidden state (as updated). For example, the RNN system may predict at least one next data item in a sequence (e.g., a next first data item in the first sequence and/or a next second data item in the second sequence) based on the hidden state (as updated). As shown in FIG. 7A, the RNN system may determine a prediction of three next viewing events 726-1, 726-2, 726-3 (collectively 726) based on the hidden state and/or the first data items 722 of the first sequence. For example, the RNN system may predict a first next viewing event 726-1 associated with a digital single-lens reflex camera (DSLR) camera, a second next viewing event 726-2 associated with a GoPro camera, a third next viewing event 726-3 associated with a camera with a telephoto lens, and/or the like. Additionally or alternatively, the RNN system may determine a prediction of three next cart-adding events 728-1, 728-2, 728-3 (collectively 728) based on the hidden state and/or the second data items 724 of the second sequence. For example, the RNN system may predict a first next cart-adding event 728-1 associated with a camera lens, a second next cart-adding event 728-2 associated with a camera stand, a third next cart-adding event 728-3 associated with a camera bag, and/or the like. In some non-limiting embodiments or aspects, the items associated with the predicted next data items may be communicated to and/or displayed on a user device (e.g., 106) associated with a user.

With reference to FIG. 7B, the RNN system may receive sequence data items (or embeddings based thereon) $x_1, x_2, \ldots, x_T$ (e.g., first data items 722 and/or second data item(s) 724) and a corresponding sequence of indicators $c_1, c_2, \ldots, c_T$, wherein T is the total number of time steps of all sequences and each respective $c_t$ is associated with a type of the respective data item $x_t$. At each respective time step t, the RNN system may input the respective data item $x_t$ and the indicator $c_t$ (or a flag matrix $F^{c_t}$ based thereon) into BAGRU 702. BAGRU 702 may also store and/or receive the hidden state from a previous time step $h_{t-1}$. In some non-limiting embodiments or aspects, the hidden state may be segmented into N segments (e.g., $h_t^{1 \cdots N}$), wherein N is the total number of types of data items (e.g., each type corresponding to a different type of event and/or different type of user behavior). In some non-limiting embodiments or aspects, there may be dependence across segments (e.g., $h_t^j | h_t^{jk} \forall 1 \le i, k \le N$), and this dependence may be incorporated into (e.g., taken into account by) attention subsystems 704, as described herein.

In some non-limiting embodiments or aspects, BAGRU 702 may include three attention subsystems 704 (e.g., $\text{Att}_r$, $\text{Att}_z$, and $\text{Att}_h$) for the reset gate $r_t$, the candidate gate $z_t$, and the candidate activation gate $\tilde{h}i_t$, respectively. As such, the reset gate $r_t$ of BAGRU 702 may receive the hidden state from the previous time step $h_{t-1}$, the respective data item $x_t$, and the respective indicator $c_t$ (or the flag matrix $F^{c_t}$ based thereon) as input and may generate an output based on the following equation:

$$r_t = \text{sigmoid}(\text{Att}_r(h_{t-1}, x_t, c_t)).$$

In some non-limiting embodiments or aspects, the candidate gate $z_t$ of BAGRU 702 may receive the hidden state from the previous time step $h_{t-1}$, the respective data item $x_t$, and the respective indicator $c_t$ (or the flag matrix $F^{c_t}$ based thereon) as input and may generate an output based on the following equation:

$$z_t = \text{sigmoid}(Att_z(h_{t-1}, x_t, c_t)).$$

In some non-limiting embodiments or aspects, the candidate activation gate $\tilde{h}_t$ of BAGRU 702 may receive the hidden state from the previous time step $h_{t-1}$, the respective data item $x_t$, the respective indicator $c_t$ (or the flag matrix $F^{c_t}$ based thereon), and the output of the reset gate $r_t$ as input and may generate an output based on the following equation:

$$\tilde{h}_t = \tanh(Att_h(r_t \odot_{t-1}, x_t, c_t)).$$

In some non-limiting embodiments or aspects, the hidden state for the current time step $h_t$ of BAGRU 702 may be determined (e.g., by the RNN system) based on the hidden state from the previous time step $h_{t-1}$, the output of the candidate gate $z_t$, and the output of the candidate activation gate $\tilde{h}_t$. For example, this may be accomplished based on the following equation:

$$h_t = (1-z_t) \odot h_{t-1} + z_t \odot \tilde{h}_t.$$

With reference to FIG. 7C, each attention subsystem 704 may receive the hidden state from the previous time step $h_{t-1}$ (or the product of the output of the reset gate $r_t$ and the hidden state from the previous time step $h_{t-1}$), the respective data item $x_t$, and the respective indicator $c_t$ (or the flag matrix $F^{c_t}$ based thereon) as input. For notation purposes, the hidden state from the previous time step $h_{t-1}$ (or the product of the output of the reset gate $r_t$ and the hidden state from the previous time step $h_{t-1}$) may also be referred to as the input vector i. In some non-limiting embodiments or aspects, attention subsystem 704 may split the input vector i into N segments. For example, this may be accomplished using the Split( ) function as follows:

$$i^{1 \cdots N} = \text{Split}(i, N).$$

In some non-limiting embodiments or aspects, for a type of data item corresponding to the indicator $c_t$ of the respective data item $x_t$, attention subsystem 704 may determine a flag matrix $F^{c_t}$ based on the indicator $c_t$ (e.g., if the input to attention subsystem 704 included $c_t$ instead of $F^{c_t}$). Additionally or alternatively, flag matrix $F^{c_t}$ may include an embedding of the type of data item corresponding to the respective indicator $c_t$. In some non-limiting embodiments or aspects, flag matrix $F^{c_t}$ for each type of data item may be predetermined and/or may be looked up by attention subsystem 704.

In some non-limiting embodiments or aspects, attention subsystem 704 may generate appended segments (e.g., query, key, and value segments) by appending the lth segment of the input vector to the respective data item $x_t$ and the flag matrix $F^{c_t}$. For example, this may be accomplished based on the following equation:

$$Q^l, K^l, V^l = \text{ConCat}(i^l, x_t, F^{c_t}).$$

For example, as shown in FIG. 7C, when N=2, $Q^1$ may include the concatenation of $i^1$, $x_t$, and $F^{c_t}$, and $Q^2$ may include the concatenation of $i^2$, $x_t$, and $F^{c_t}$. Additionally, $K^1$ may include the concatenation of $i^1$, $x_t$, and $F^{c_t}$, and $K^2$ may include the concatenation of $i^2$, $x_t$, and $F^{c_t}$. In addition, $V^1$ may include the concatenation of $i^1$, $x_t$, and $F^{c_t}$, and $V^2$ may include the concatenation of $i^2$, $x_t$, and $F^{c_t}$.

In some non-limiting embodiments or aspects, attention subsystem 704 may multiply these appended segments by a respective (trainable) weight matrix (e.g., $W_q$, $W_k$, and $W_v$) to form query (Q), key (K), and value (V) matrices. (In some non-limiting embodiments or aspects, one of these matrices, such as value matrix V may also include a bias vector by). For example, this may be accomplished based on the following equation:

$$Q, K, V = QW_q, KW_k, VW_v + b_v.$$

In some non-limiting embodiments or aspects, attention subsystem 704 may determine attentional weights (e.g., dot-product attention) based on the query (Q), key (K), and value (V) matrices using a multi-head formulation with m heads. For example this may be accomplished based on the following equations:

$$Q, K, V = \text{Split}(Q, m), \text{Split}(K, m), \text{Split}(V, m);$$

$$O_j = \text{Softmax}(Q_j K_j^T) V_j;$$

$$O = g(\text{ConCat}(O_{1 \ldots m})).$$

where g( ) may represent a non-linearity activation function (e.g., sigmoid( ) or tanh( )), and where j is the current head of m heads (e.g., $1 \geq j \geq m$). As such, the output of each of the reset gate $r_t$, the candidate gate $z_t$, and the candidate activation gate $\tilde{h}_t$ may be based on the respective output of the corresponding attention subsystem 704 (e.g., $Att_r$, $Att_z$, and $Att_h$, respectively).

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A computer-implemented method, comprising:
receiving, with at least one processor, first input data associated with a plurality of first data items ordered in a first time sequence and second input data associated with a plurality of second data items ordered in a second time sequence, each first data item of the plurality of first data items associated with a respective first event of a first type, each second data item of the plurality of second data items associated with a respective second event of a second type different than the first type, wherein the plurality of first data items and the plurality of second data items are received asynchronously;
for each respective data item of the plurality of first data items and the plurality of second data items:
inputting, with the at least one processor, the respective data item and an indicator associated with a respective type of the respective data item to a recurrent unit of a recurrent neural network (RNN), the respective type comprising one of the first type or the second type;
determining, with the at least one processor, a respective portion of a hidden state of the RNN based on the indicator, wherein determining the respective portion of the hidden state comprises:
splitting the hidden state into a plurality of hidden state segments comprising a first portion of the hidden state segment associated with the first type and a second portion of the hidden state segment associated with the second type; and selecting the first portion of the hidden state segment or the second portion of the hidden state segment based on the indicator; and updating, with the at least one processor, the respective portion of the hidden state of the RNN using an attention mechanism based on the respective data item, the indicator, and trainable parameters of the RNN, wherein the indicator comprises a slice of each flag tensor of a plurality of flag tensors, the plurality of flag tensors comprising a query flag tensor, a key flag tensor, and a value flag tensor, wherein updating the respective portion of the hidden state using the attention mechanism comprises:

appending a previous hidden state of the respective portion of the hidden state with a respective slice of each flag tensor and the respective data item and multiplying with a respective weight to generate each hidden state segment;

concatenating each hidden state segment with each of a plurality of flag vectors from the slice of each flag tensor;

determining at least one query vector, at least one key vector, and at least one value vector based on the hidden state segments having the plurality of flag vectors concatenated therewith; and updating each hidden state segment of the plurality of hidden state segments based on the at least one query vector, the at least one key vector, and the at least one value vector; and determining, with the at least one processor, at least one prediction based on the hidden state as updated.

2. The method of claim 1, wherein splitting the hidden state comprises splitting the hidden state into a plurality of hidden state segments, each hidden state segment of the plurality of hidden state segments comprising comprises a matrix, at least one of the plurality of hidden state segments comprising the respective portion of the hidden state, wherein a first hidden state segment of the plurality of hidden state segments comprises the first portion of the hidden state and wherein a second hidden state segment of the plurality of hidden state segments comprises the first portion of the hidden state;

wherein updating the respective portion of the hidden state comprises updating each hidden state segment of the plurality of hidden state segments based on the attention mechanism; and wherein the plurality of hidden state segments as updated combine to provide the hidden state as updated.

3. The method of claim 1, wherein splitting the hidden state into the plurality of hidden state segments comprises splitting the hidden state into the plurality of hidden state segments based on a number of types.

4. A system, comprising:
at least one processor; and
at least one non-transitory computer-readable medium including one or more instructions that, when executed by the at least one processor, direct the at least one processor to:
receive first input data associated with a plurality of first data items ordered in a first time sequence and second input data associated with a plurality of second data items ordered in a second time sequence, each first data item of the plurality of first data items associated with a respective first event of a first type, each second data item of the plurality of second data items associated with a respective second event of a second type different than the first type, wherein the plurality of first data items and the plurality of second data items are received asynchronously;

for each respective data item of the plurality of first data items and the plurality of second data items:

input the respective data item and an indicator associated with a respective type of the respective data item to a recurrent unit of a recurrent neural network (RNN), the respective type comprising one of the first type or the second type;

determine a respective portion of a hidden state of the RNN based on the indicator, wherein determining the respective portion of the hidden state comprises:

splitting the hidden state into a plurality of hidden state segments comprising a first portion of the hidden state segment associated with the first type and a second portion of the hidden state segment associated with the second type; and selecting the first portion of the hidden state segment or the second portion of the hidden state segment based on the indicator; and update the respective portion of the hidden state of the RNN using an attention mechanism based on the respective data item, the indicator, and trainable parameters of the RNN, wherein the indicator comprises a slice of each flag tensor of a plurality of flag tensors, the plurality of flag tensors comprising a query flag tensor, a key flag tensor, and a value flag tensor, wherein updating the respective portion of the hidden state using the attention mechanism comprises:

appending a previous hidden state of the respective portion of the hidden state with a respective slice of each flag tensor and the respective data item and multiplying with a respective weight to generate each hidden state segment;

concatenating each hidden state segment with each of a plurality of flag vectors from the slice of each flag tensor;

determining at least one query vector, at least one key vector, and at least one value vector based on the hidden state segments having the plurality of flag vectors concatenated therewith; and updating each hidden state segment of the plurality of hidden state segments based on the at least one query vector, the at least one key vector, and the at least one value vector; and determine at least one prediction based on the hidden state as updated.

5. The system of claim 4, wherein splitting the hidden state comprises splitting the hidden state into a plurality of hidden state segments, each hidden state segment of the plurality of hidden state segments comprising comprises a matrix, at least one of the plurality of hidden state segments comprising the respective portion of the hidden state, wherein a first hidden state segment of the plurality of hidden state segments comprises the first portion of the hidden state and wherein a second hidden state segment of the plurality of hidden state segments comprises the first portion of the hidden state;

wherein updating the respective portion of the hidden state comprises updating each hidden state segment of the plurality of hidden state segments based on the attention mechanism; and wherein the plurality of hidden state segments as updated combine to provide the hidden state as updated.

6. The system of claim 4, wherein splitting the hidden state into the plurality of hidden state segments comprises splitting the hidden state into the plurality of hidden state segments based on a number of types.

7. A computer program product comprising at least one non-transitory computer-readable medium including one or more instructions that, when executed by at least one processor, cause the at least one processor to:
receive first input data associated with a plurality of first data items ordered in a first time sequence and second input data associated with a plurality of second data items ordered in a second time sequence, each first data item of the plurality of first data items associated with a respective first event of a first type, each second data item of the plurality of second data items associated with a respective second event of a second type different than the first type, wherein the plurality of first data items and the plurality of second data items are received asynchronously;
for each respective data item of the plurality of first data items and the plurality of second data items:
input the respective data item and an indicator associated with a respective type of the respective data item to a recurrent unit of a recurrent neural network (RNN), the respective type comprising one of the first type or the second type;
determine a respective portion of a hidden state of the RNN based on the indicator, wherein determining the respective portion of the hidden state comprises:
splitting the hidden state into a plurality of hidden state segments comprising a first portion of the hidden state segment associated with the first type and a second portion of the hidden state segment associated with the second type; and
selecting the first portion of the hidden state segment or the second portion of the hidden state segment based on the indicator; and
update the respective portion of the hidden state of the RNN using an attention mechanism based on the respective data item, the indicator, and trainable parameters of the RNN,
wherein the indicator comprises a slice of each flag tensor of a plurality of flag tensors, the plurality of flag tensors comprising a query flag tensor, a key flag tensor, and a value flag tensor, wherein updating the respective portion of the hidden state using the attention mechanism comprises:
appending a previous hidden state of the respective portion of the hidden state with a respective slice of each flag tensor and the respective data item and multiplying with a respective weight to generate each hidden state segment;
concatenating each hidden state segment with each of a plurality of flag vectors from the slice of each flag tensor;
determining at least one query vector, at least one key vector, and at least one value vector based on the hidden state segments having the plurality of flag vectors concatenated therewith; and
updating each hidden state segment of the plurality of hidden state segments based on the at least one query vector, the at least one key vector, and the at least one value vector; and
determine at least one prediction based on the hidden state as updated.

8. The computer program product of claim 7, wherein splitting the hidden state comprises splitting the hidden state into a plurality of hidden state segments, each hidden state segment of the plurality of hidden state segments comprising comprises a matrix, at least one of the plurality of hidden state segments comprising the respective portion of the hidden state, wherein a first hidden state segment of the plurality of hidden state segments comprises the first portion of the hidden state and wherein a second hidden state segment of the plurality of hidden state segments comprises the first portion of the hidden state;
wherein updating the respective portion of the hidden state comprises updating each hidden state segment of the plurality of hidden state segments based on the attention mechanism; and
wherein the plurality of hidden state segments as updated combine to provide the hidden state as updated.

9. The computer program product of claim 7, wherein splitting the hidden state into the plurality of hidden state segments comprises splitting the hidden state into the plurality of hidden state segments based on a number of types.

* * * * *